United States Patent
Sitaraman et al.

(10) Patent No.: US 7,023,879 B1
(45) Date of Patent: Apr. 4, 2006

(54) DYNAMIC MULTI-HOP INGRESS TO EGRESS L2TP TUNNEL MAPPING

(75) Inventors: Aravind Sitaraman, Bangalore (IN); Purnam Anil Sheth, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 770 days.

(21) Appl. No.: 09/802,410

(22) Filed: Mar. 9, 2001

(51) Int. Cl.
 *H04J 3/16* (2006.01)
(52) U.S. Cl. ...................................... 370/466; 370/465
(58) Field of Classification Search ............... 370/474, 370/230, 235, 238, 252, 338, 356, 392, 395.6, 370/401, 351, 395.52, 395.61, 400, 437, 370/465, 466, 467; 709/224, 227
See application file for complete search history.

(56) References Cited

U.S. PATENT DOCUMENTS

| | | |
|---|---|---|
| 4,644,532 A | 2/1987 | George et al. |
| 4,669,113 A | 5/1987 | Ash et al. |
| 4,896,319 A | 1/1990 | Lidinsky et al. |
| 4,995,074 A | 2/1991 | Goldman et al. |
| 5,014,265 A | 5/1991 | Hahne et al. |
| 5,115,427 A | 5/1992 | Johnson, Jr. et al. |
| 5,159,592 A | 10/1992 | Perkins |
| 5,239,537 A | 8/1993 | Sakauchi |
| 5,265,245 A | 11/1993 | Nordstrom et al. |
| 5,274,634 A | 12/1993 | Babiarz |
| 5,274,643 A | 12/1993 | Fisk ........................... 370/94.1 |
| 5,280,470 A | 1/1994 | Buhrke et al. ................ 370/13 |
| 5,305,311 A | 4/1994 | Lyles ........................... 370/60 |

(Continued)

FOREIGN PATENT DOCUMENTS

WO  99/23852  5/1999

OTHER PUBLICATIONS

Carrel, D. et al., "The TACACS+ Protocol, Version 1.78", Cisco Systems, Inc., printed from ftp://ftp-eng.cisco.com/gdweber/tax-rfc.1.78 txt on Oct. 23, 2000.

(Continued)

*Primary Examiner*—Phirin Sam
(74) *Attorney, Agent, or Firm*—Thelen Reid & Priest LLP; John P. Schaub

(57) ABSTRACT

A method for dynamic ingress to egress tunnel mapping from a first communication network to a second communication network includes receiving a tunneled communication from a subscriber using the first communication network, determining egress tunnel selection criteria for the tunneled communication, selecting one of at least one egress tunnel based on the egress tunnel selection criteria and forwarding the tunneled communication on the selected egress tunnel. The egress tunnel selection criteria indicate the basis for selecting one of the egress tunnels. An apparatus for dynamic ingress to egress tunnel mapping from a first communication network to a second communication network includes a receiving interface to receive a tunneled communication from a subscriber using the first communication network, an egress tunnel selection criteria determiner to determine egress tunnel selection criteria for the tunneled communication, an egress tunnel selector to select one of at least one egress tunnel based on the egress tunnel selection criteria and a session forwarder to forward the tunneled communication on the selected egress tunnel. In one aspect of the invention, tunnel mapping is performed between Layer 2 Tunneling Protocol (L2TP) ingress and egress tunnels.

73 Claims, 18 Drawing Sheets

U.S. PATENT DOCUMENTS

| | | |
|---|---|---|
| 5,347,511 A | 9/1994 | Gun |
| 5,371,852 A | 12/1994 | Attanasio et al. |
| 5,406,643 A | 4/1995 | Burke et al. |
| 5,408,469 A | 4/1995 | Opher et al. ............... 370/60.1 |
| 5,416,842 A | 5/1995 | Aziz |
| 5,422,882 A | 6/1995 | Hiller et al. ............... 370/60.1 |
| 5,426,636 A | 6/1995 | Hiller et al. ............... 370/60.1 |
| 5,428,607 A | 6/1995 | Hiller et al. ............... 370/60.1 |
| 5,430,715 A | 7/1995 | Corbalis et al. ............. 370/54 |
| 5,437,013 A | 7/1995 | Rubin et al. |
| 5,452,297 A | 9/1995 | Hiller et al. ............... 370/60.1 |
| 5,461,624 A | 10/1995 | Mazzola |
| 5,469,556 A | 11/1995 | Clifton |
| 5,510,777 A | 4/1996 | Pilc et al. |
| 5,539,884 A | 7/1996 | Robrock, II |
| 5,555,244 A | 9/1996 | Gupta et al. ............... 370/60.1 |
| 5,570,361 A | 10/1996 | Norizuki et al. ........... 370/60.1 |
| 5,578,955 A | 11/1996 | Matsue et al. |
| 5,583,862 A | 12/1996 | Callon ........................ 370/397 |
| 5,588,003 A | 12/1996 | Ohba et al. |
| 5,602,918 A | 2/1997 | Chen et al. |
| 5,604,803 A | 2/1997 | Aziz |
| 5,617,417 A | 4/1997 | Sathe et al. |
| 5,621,721 A | 4/1997 | Vatuone ....................... 370/16 |
| 5,623,605 A | 4/1997 | Keshav et al. |
| 5,631,897 A | 5/1997 | Pacheco et al. |
| 5,642,515 A | 6/1997 | Jones et al. |
| 5,649,108 A | 7/1997 | Spiegel et al. |
| 5,655,077 A | 8/1997 | Jones et al. |
| 5,671,354 A | 9/1997 | Ito et al. |
| 5,673,265 A | 9/1997 | Gupta et al. |
| 5,684,950 A | 11/1997 | Dare et al. |
| 5,689,566 A | 11/1997 | Nguyen |
| 5,708,812 A | 1/1998 | Van Dyke et al. |
| 5,715,399 A | 2/1998 | Bezos |
| 5,717,690 A | 2/1998 | Peirce, Jr. et al. |
| 5,734,654 A | 3/1998 | Shirai et al. ................. 370/396 |
| 5,740,171 A | 4/1998 | Mazzola et al. |
| 5,740,176 A | 4/1998 | Gupta et al. |
| 5,740,371 A | 4/1998 | Wallis |
| 5,742,604 A | 4/1998 | Edsall et al. |
| 5,745,708 A | 4/1998 | Weppler et al. |
| 5,764,636 A | 6/1998 | Edsall |
| 5,768,519 A | 6/1998 | Swift et al. |
| 5,796,732 A | 8/1998 | Mazzola et al. |
| 5,802,290 A | 9/1998 | Casselman |
| 5,815,665 A | 9/1998 | Teper et al. |
| 5,852,607 A | 12/1998 | Chin ........................... 370/401 |
| 5,864,542 A | 1/1999 | Gupta et al. ............... 370/257 |
| 5,918,019 A | 6/1999 | Valencia |
| 5,944,824 A | 8/1999 | He |
| 5,949,755 A | 9/1999 | Uphadya et al. |
| 5,991,828 A | 11/1999 | Horie et al. ................... 710/8 |
| 5,999,514 A | 12/1999 | Kato |
| 5,999,518 A | 12/1999 | Nattkemper et al. |
| 6,009,103 A | 12/1999 | Woundy ..................... 370/401 |
| 6,011,910 A | 1/2000 | Chau et al. |
| 6,021,496 A | 2/2000 | Dutcher et al. |
| 6,023,474 A | 2/2000 | Gardner |
| 6,026,441 A | 2/2000 | Ronen ........................ 709/227 |
| 6,044,402 A | 3/2000 | Jacobson et al. |
| 6,047,376 A | 4/2000 | Hosoe |
| 6,061,650 A | 5/2000 | Malkin et al. |
| 6,069,895 A | 5/2000 | Ayandeh |
| 6,078,957 A * | 6/2000 | Adelman et al. ............ 709/224 |
| 6,081,508 A * | 6/2000 | West et al. ................. 370/238 |
| 6,081,518 A | 6/2000 | Bowman-Amuah |
| 6,084,892 A | 7/2000 | Benash et al. |
| 6,091,951 A | 7/2000 | Sturniolo et al. ........... 455/432 |
| 6,092,178 A | 7/2000 | Jindal et al. |
| 6,092,196 A | 7/2000 | Reiche |
| 6,094,437 A | 7/2000 | Loehndorf, Jr. et al. |
| 6,108,708 A | 8/2000 | Iwata |
| 6,115,468 A | 9/2000 | De Nicolo |
| 6,118,785 A | 9/2000 | Araujo et al. |
| 6,119,160 A | 9/2000 | Zhang et al. ............... 709/224 |
| 6,134,666 A | 10/2000 | De Nicolo |
| 6,154,775 A | 11/2000 | Coss et al. |
| 6,212,561 B1 | 4/2001 | Sitaraman et al. |
| 6,236,655 B1 | 5/2001 | Caldara et al. |
| 6,252,878 B1 | 6/2001 | Locklear, Jr. et al. |
| 6,298,043 B1 | 10/2001 | Mauger et al. |
| 6,301,229 B1 * | 10/2001 | Araujo et al. ............... 370/252 |
| 6,308,213 B1 | 10/2001 | Valencia |
| 6,396,838 B1 | 5/2002 | Palnati |
| 6,400,716 B1 | 6/2002 | Munakata et al. |
| 6,408,336 B1 | 6/2002 | Schneider et al. |
| 6,412,003 B1 | 6/2002 | Melen |
| 6,415,313 B1 | 7/2002 | Yamada et al. |
| 6,430,152 B1 | 8/2002 | Jones et al. |
| 6,434,156 B1 * | 8/2002 | Yeh .............................. 370/401 |
| 6,438,612 B1 | 8/2002 | Ylonen et al. |
| 6,446,200 B1 | 9/2002 | Ball et al. |
| 6,456,623 B1 | 9/2002 | Kobayasi et al. |
| 6,463,475 B1 | 10/2002 | Calhoun |
| 6,466,976 B1 | 10/2002 | Alles et al. |
| 6,498,845 B1 | 12/2002 | Martz et al. |
| 6,507,577 B1 * | 1/2003 | Mauger et al. .............. 370/356 |
| 6,519,254 B1 * | 2/2003 | Chuah et al. ................ 370/389 |
| 6,522,627 B1 * | 2/2003 | Mauger ....................... 370/230 |
| 6,526,033 B1 * | 2/2003 | Wang et al. ................. 370/338 |
| 6,542,919 B1 | 4/2003 | Wendorf et al. |
| 6,597,689 B1 | 7/2003 | Chiu et al. |
| 6,609,153 B1 | 8/2003 | Salkewicz |
| 6,614,809 B1 * | 9/2003 | Verma et al. ................ 370/469 |
| 6,615,358 B1 | 9/2003 | Dowd et al. |
| 6,651,096 B1 | 11/2003 | Gai et al. |
| 6,654,792 B1 | 11/2003 | Verma et al. |
| 6,665,273 B1 * | 12/2003 | Goguen et al. .............. 370/252 |
| 6,665,305 B1 | 12/2003 | Weismann |
| 6,717,944 B1 * | 4/2004 | Bryden et al. ............... 370/392 |
| 6,741,599 B1 * | 5/2004 | Dunn et al. ............... 370/395.6 |
| 6,785,228 B1 | 8/2004 | Vandette et al. |
| 2002/0116501 A1 * | 8/2002 | Ho et al. ..................... 709/227 |

OTHER PUBLICATIONS

"Cisco Asymmetric Digital Subscriber Line Servcies Architecture", Cisco Systems, White Paper, printed from http://www.cisco.com/warp/public/cc/so/neso/dsso/global/adsl_wp.htm on Sep. 27, 2000.

Cisco, Product Bulletin—No. 1120, Cisco 6400 Universal Access Concentrator, printed from http://www.cisco.com/warp/public/cc/pd/as/6400/prodlit/1120_pp.htm on Oct. 4, 2000.

Cisco, "Layer 2 Tunnel Protocol", Release 12.0(1)T and 11.3(5)AA, 53 pages.

"Cisco 6400 Access Concentrators", Cisco Systems, Inc., printed from http://www.cisco.com/warp/public/cc/pd/as/6400/index.shtml on Sep. 27, 2000.

Cisco, "Cisco 6400 Series Universal Access Concentrator", printed from http://www.cisco.com/warp/public/cc/pd/as/6400/prodlit/6400_ds.htm on Sep. 27, 2000.

"L2TP", 1998, Mecklermedia Corporation, printed from http://www.webopedia.internet.com/TERM/L/L2TP/html.

David Allan, "Semi Permanent PPP Connections (sP$^4$)", Nortel Networks, pp. 1-7, Feb. 8-11, 2000.

David R. Safford et al., "Secure RPC Authentication (SRA) for TELNET and FTP", USENIX Association, 1993.

Christoph L. Schuba et al., "Countering Abuse of Name-Based Authentication", COAST Laboratory, Department of Computer Sciences, Purdue University, date unknown, 21 pages.

Ascend Communications, "MultiVPN from Ascend Communications: Breaking Down the Barriers to VPNs", White Paper, 1998.

Fogarty et al., "Microsoft Tunnels Through the Net with New Protocol", WANs & Internetworking, Network World, pp. 17 and 20, Mar. 18, 1996.

Mathieson et al., "High Speed Communications for Control Systems", IEEE, pp. 1826-1828, 1993.

Rigney et al., Remote Authentication Dial in User Service (Radius), Network Working Group, pp. 1-57, Apr. 1997.

Mecklermedia Corporation, "Tunneling", printed from http://webopedia.internet.com/TERM/t/tunneling.html. 1998.

Valencia et al., "Layer Two Tunneling Protocol L2TP", PPP Working Group, pp. 1-93, May 1998.

Xu et al., "Design and Evaluation of a High-Performance ATM Firewall Switch and its Applications", IEEE Journal on Selected Areas in Communications, vol. 17, No. 6, pp. 1190-1200, Jun. 1999.

* cited by examiner

DYNAMIC MULTI-HOP INGRESS TO EGRESS L2TP TUNNEL MAPPING

CROSS REFERENCE TO RELATED APPLICATIONS

This application is related to the following:

U.S. patent application Ser. No. 09/488,394, filed Jan. 20, 2000 in the name of inventors Aravind Sitaraman, Aziz Abdul, Bernard Janes, Dennis Cox, John Joyce, Peter Heitman, Shujin Zhang and Rene Tio, entitled "System and Method for Identifying a Subscriber for Connection to a Communication Network", commonly assigned herewith.

U.S. patent application Ser. No. 09/488,395, filed Jan. 20, 2000 in the name of inventors Aravind Sitaraman, Dennis Cox, John Joyce and Shujin Zhang, entitled "System and Method for Determining Subscriber Information", commonly assigned herewith.

U.S. patent application Ser. No. 09/712,005, filed Nov. 13, 2000 in the name of inventors Purnam Sheth, Aravind Sitaraman, Charles Yager and Gregory Burns, entitled "PPP/L2TP Domain Name Pre-Authorization", commonly assigned herewith.

U.S. patent application Ser. No. 09/712,780, filed Nov. 13, 2000 in the name of inventors Purnam Sheth, Aravind Sitaraman, Charles Yager and Gregory Burns, entitled "PPP Domain Name and L2TP Tunnel Selection Configuration Override", commonly assigned herewith.

U.S. patent application Ser. No. 09/795,688, filed Feb. 27, 2001 in the name of inventors Aravind Sitaraman and Purnam Sheth, entitled "Load Sharing Between L2TP Tunnels", commonly assigned herewith.

FIELD OF THE INVENTION

The present invention relates to the field of data communications. More particularly, the present invention relates to a system and method for dynamic multi-hop ingress to egress L2TP tunnel mapping.

BACKGROUND OF THE INVENTION

Computer networking capabilities of a home personal computer (PC) are typically provided by telephone companies (Telcos) or commercial Internet Service Providers (ISPs) who operate network access points along the information superhighway. It is through these network access points that the user is able to connect with public domains, such as the Internet, and private domains, such as an intra-company computer network of the user's employer.

In the wholesale Internet access environment, the network access provider (NAP) and the network service provider (NSP) are not necessarily the same entity. Telcos and other wholesale ISPs are typical NAPs, who operate gateways (network access servers, access routers, or the like) in their points of presence (PoPs), and provide local loop access services to PCs. NSPs are typically the customers of NAPs, who are allowed to use the NAP's gateways to provide their Internet Protocol (IP)-based services, such as Internet access, network access, or voice over IP (VoIP) services to the PCs.

FIG. 1 illustrates Layer 2 Tunneling Protocol (L2TP). L2TP tunneling is a common service architecture for Point-to-Point Protocol (PPP) clients currently available at NAPs. In the typical L2TP tunneling environment, a PC 100 of a PPP client 105 starts a PPP session by dialing into a L2TP access concentrator (LAC) 110 located at the NAP's point of presence (PoP). The LAC 110 exchanges PPP messages with the client's PC 100 and communicates with a L2TP network server (LNS) 115 of a remote domain 120 such as an ISP or a private company. The LNS 115 is typically a home gateway (HGW) of the remote domain 120. The communication between the LAC 110 and the LNS 115 is by way of L2TP requests and responses. When a L2TP tunnel 125 is set up, the LAC 110 forwards the PPP session over the L2TP tunnel 125 to the LNS 115. Data packets in the PPP session are encapsulated into L2TP frames that are destined for the IP address of the LNS 115.

The LNS 115 is a termination point of the L2TP tunnel 125. The LNS 115 accepts L2TP frames, strips the L2TP encapsulation, and processes the incoming PPP frames for the appropriate interface. The PPP frames are processed and passed to higher layer protocols, i.e., the PPP session is terminated at the LNS 115. The PPP session termination requires and includes user authentication via a Remote Authentication Dial-In User Service (RADIUS) or other means. An authenticated PPP client then receives an IP address, a Domain Name System (DNS) address, and IP-based services that the client contracted. These are forwarded back to the client over the L2TP tunnel 125 through the LAC 110.

The L2TP passes protocol-level (or Data Link-level) packets through the virtual tunnel between the endpoints of a point-to-point connection, i.e., the client's PC 100 and the LNS 115. The L2TP is suitable for virtual private networking (VPN), in which users can dial into a NAP's network access server and join a private (typically corporate) network that is remote from the NAP's PoP.

FIG. 2 is a block diagram that illustrates a L2TP service architecture in which the NAP and NSP are different entities. Users A 200 and C 205 represent authorized users of a network at remote domain 210 and users B 215 and D 220 represent authorized users of a network at remote domain 225. A router may operate as both a LNS to given set of LACs and simultaneously as a LAC to a given LNS. When configured to operate in this way, the router is called a "multi-hop node" or "egress LAC". In FIG. 2, NAP 230 provides network access to user C 205 and user D 220 and ingress LAC 235 tunnels PPP sessions via ingress tunnels 240 and 270 to egress LACs 245 and 265, respectively. NAP 250 provides network access to user A 200 and user B 215 and ingress LAC 255 tunnels PPP sessions via ingress tunnels 260 and 275 to egress LACs 265 and 245, respectively. Egress LAC 245 aggregates tunnels 240 and 275 into a single egress tunnel 280 to the LNS 285 at remote domain 210. Egress LAC 265 aggregates ingress tunnels 260 and 270 into a single egress tunnel 290 to the LNS 295 at remote domain 225. NSP 203 may also provide services for other remote domains (not shown in FIG. 2).

A typical service level agreement (SLA) specifies a minimum bandwidth to be provided during specified times of the day or week together with pricing information for the provision of such services. As shown in FIG. 2, NAP 250 and NAP 230 have separate SLAs 207, 213 with NSP 203. Additionally, NSP 203 has a third SLA 217 with remote domain 225 and a fourth SLA 223 with remote domain 210. However, sessions utilizing egress tunnel 290 are accorded the same level of service for the interface to LNS 295, and sessions utilizing egress tunnel 280 are accorded the same level of service for the interface to LNS 285.

NSPs typically aggregate a relatively high number of ingress tunnels from NAPs to a relatively low number of tunnels to a remote domain, and egress LACs are statically allocated to particular remote domains based upon expected network usage. As shown in FIG. 2, NSP 203 allocates a separate egress LAC for each remote domain. Egress LAC 265 is allocated for remote domain 295 and egress LAC 245 is allocated for remote domain 210. This static architecture allows for a limited increase in the number of subscribers using a particular egress LAC without reconfiguring the network. For example, if the subscribers using NAP 230 to access remote domain 210 increases beyond the capacity of egress LAC 245 to provide a minimum level of service, the network may have to be reconfigured by, for example, adding another egress LAC at NSP 203.

This approach has a number of drawbacks. First, placing all L2TP sessions for a particular remote domain on a single egress tunnel accords the same level of service to all sessions using that egress tunnel, regardless of any SLAs. Second, tying particular egress LACs to particular remote domains reduces scalability by requiring manual reconfiguration whenever an egress LAC becomes overutilized. Third, static configuration may allow some egress LACs to be underutilized while simultaneously allowing other egress LACs to be overutilized, resulting in a relatively inefficient utilization of resources.

What is needed is a solution that enables differentiated service for sessions using an egress tunnel. A further need exists for such a solution that minimizes the amount of network engineering required by NAPs and NSPs. Yet another need exists for such a solution that allows a service provider to share the same egress LAC across multiple remote domains while maintaining SLAs, providing relatively efficient utilization of resources.

BRIEF DESCRIPTION OF THE INVENTION

A method for dynamic ingress to egress tunnel mapping from a first communication network to a second communication network includes receiving a tunneled communication from a subscriber using the first communication network, determining egress tunnel selection criteria for the tunneled communication, selecting one of at least one egress tunnel based on the egress tunnel selection criteria and forwarding the tunneled communication on the selected egress tunnel. The egress tunnel selection criteria indicate the basis for selecting one of the egress tunnels. An apparatus for dynamic ingress to egress tunnel mapping from a first communication network to a second communication network includes a receiving interface to receive a tunneled communication from a subscriber using the first communication network, an egress tunnel selection criteria determiner to determine egress tunnel selection criteria for the tunneled communication, an egress tunnel selector to select one of at least one egress tunnel based on the egress tunnel selection criteria and a session forwarder to forward the tunneled communication on the selected egress tunnel. In one aspect of the invention, tunnel mapping is performed between Layer 2 Tunneling Protocol (L2TP) ingress and egress tunnels.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION OF A PREFERRED EMBODIMENT

Figure 1:
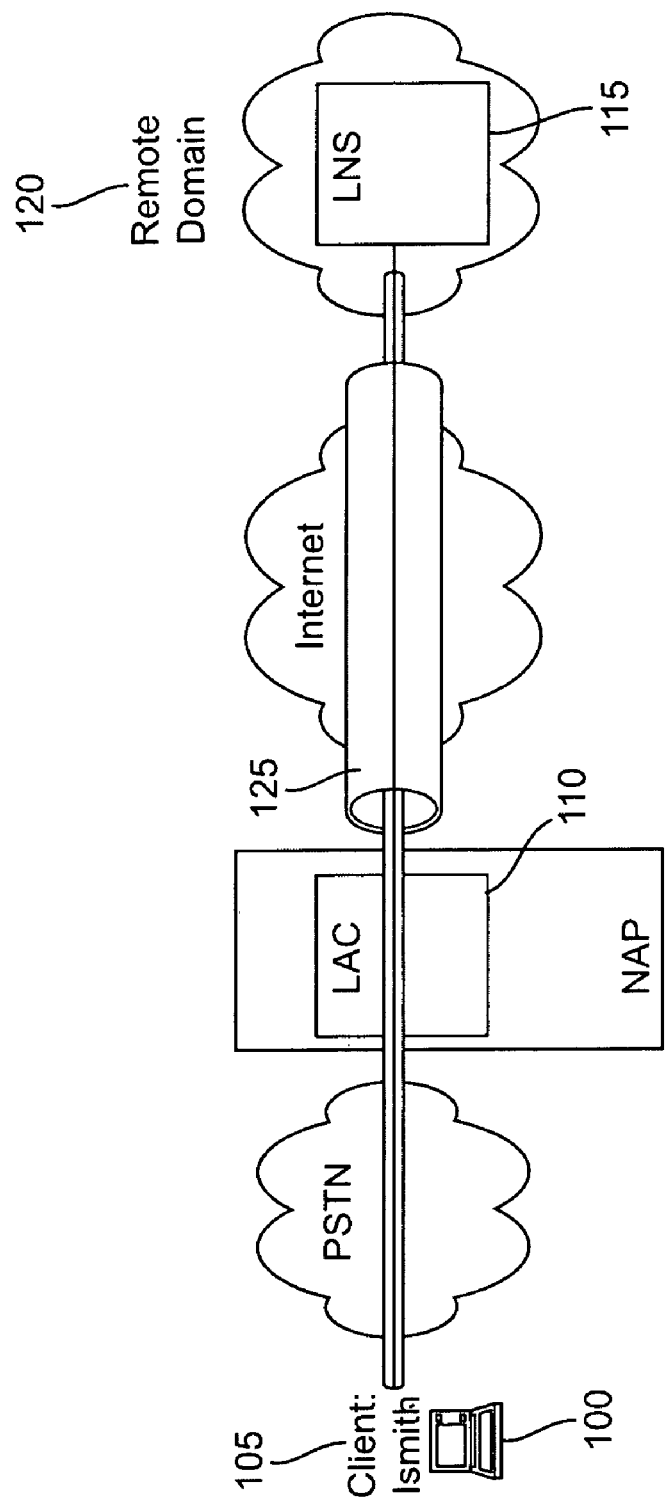
FIG. 1 is a block diagram that illustrates a L2TP tunnel and how a user typically connects to a remote domain.
Figure 2:
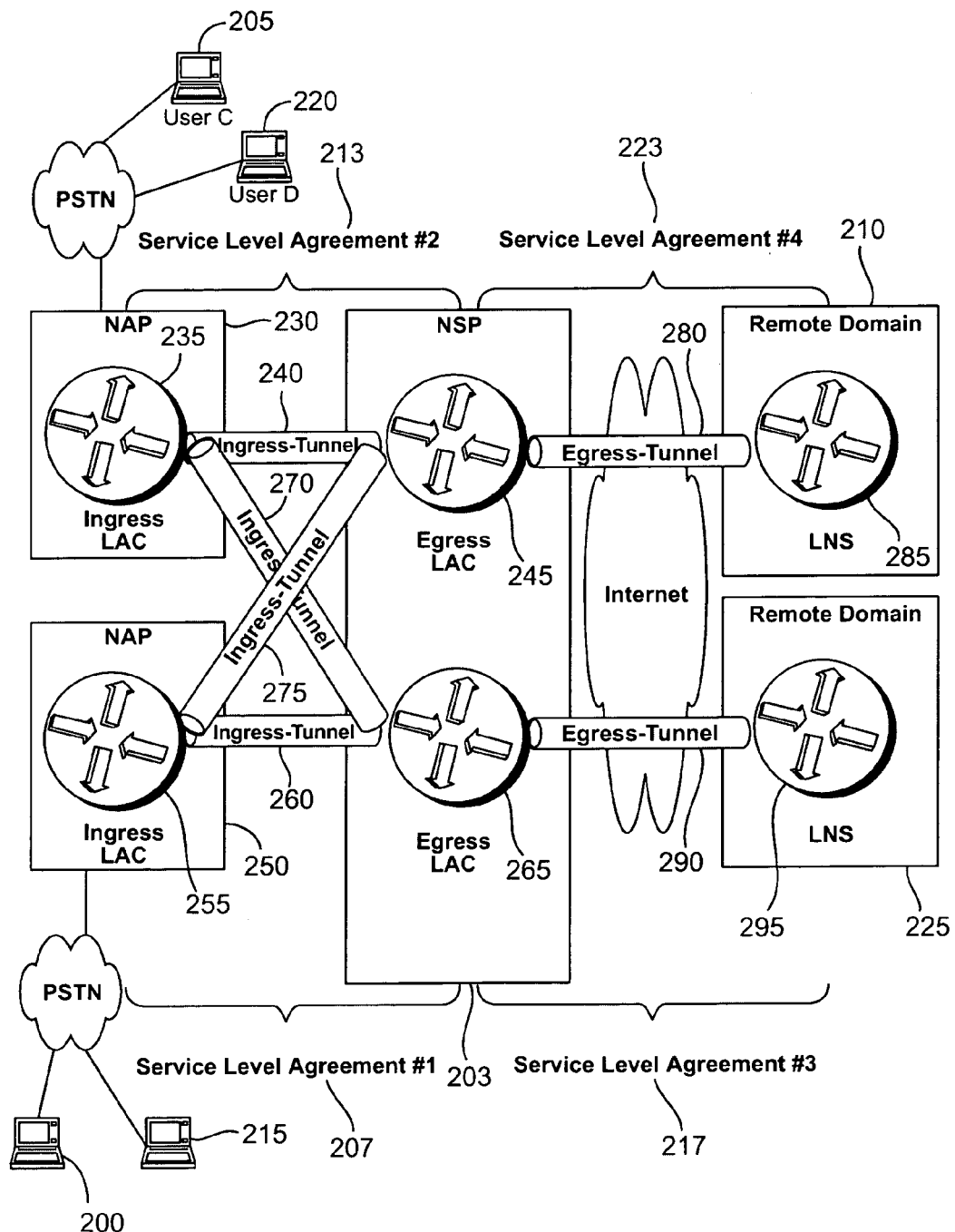
FIG. 2 is a block diagram that illustrates a L2TP service architecture in which the NAP and NSP are different entities.

Embodiments of the present invention are described herein in the context of a system and method for dynamic multi-hop ingress to egress L2TP tunnel mapping. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In the context of the present invention, the term "network" includes local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In accordance with one embodiment of the present invention, the components, processes and/or data structures may be implemented using C or C++ programs running on high performance computers (such as an Enterprise 2000™ server running Sun Solaris™ as its operating system. The Enterprise 2000™ server and Sun Solaris™ operating system are products available from Sun Microsystems, Inc. of Mountain View, Calif.). Different implementations may be used and may include other types of operating systems, computing platforms, computer programs, firmware, computer languages and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The authentication, authorization and accounting (AAA) service performs user authentication, user authorization and user accounting functions. It may be a Cisco ACS™ product such as Cisco Secure™, available from Cisco Systems, Inc. of San Jose, Calif., or an equivalent product. In accordance with a presently preferred embodiment of the present invention, the Remote Authentication Dial-In User Service (RADIUS) protocol is used as the communication protocol for carrying AAA information. RADIUS is an Internet standard track protocol for carrying authentication, authorization, accounting and configuration information between devices that desire to authenticate their links and a shared AAA or AAA proxy service. Those of ordinary skill in the art will realize that other authentication protocols such as TACACS+ or DIAMETER can be used as acceptable authentication communications links between the various communications devices that encompass the data communication network and still be within the inventive concepts disclosed herein.

According to embodiments of the present invention, a network tunnel switch such as an Egress LAC or multi-hop node maps sessions in ingress tunnels to a particular egress tunnel that terminates at a remote domain. Egress tunnel selection may be based on a static tunnel-mapping algorithm, in which a session in an ingress tunnel is allocated to an egress tunnel without regard to the current capacity of each egress tunnel to the remote domain. Alternatively, a load factor for available egress tunnels to the remote domain may be considered in determining which egress tunnel to use. The load factor may be based upon parameters such as ingress tunnel ID, subscriber domain, time of day, day of week, quality of service level and subscribed network bandwidth.

Figure 3:
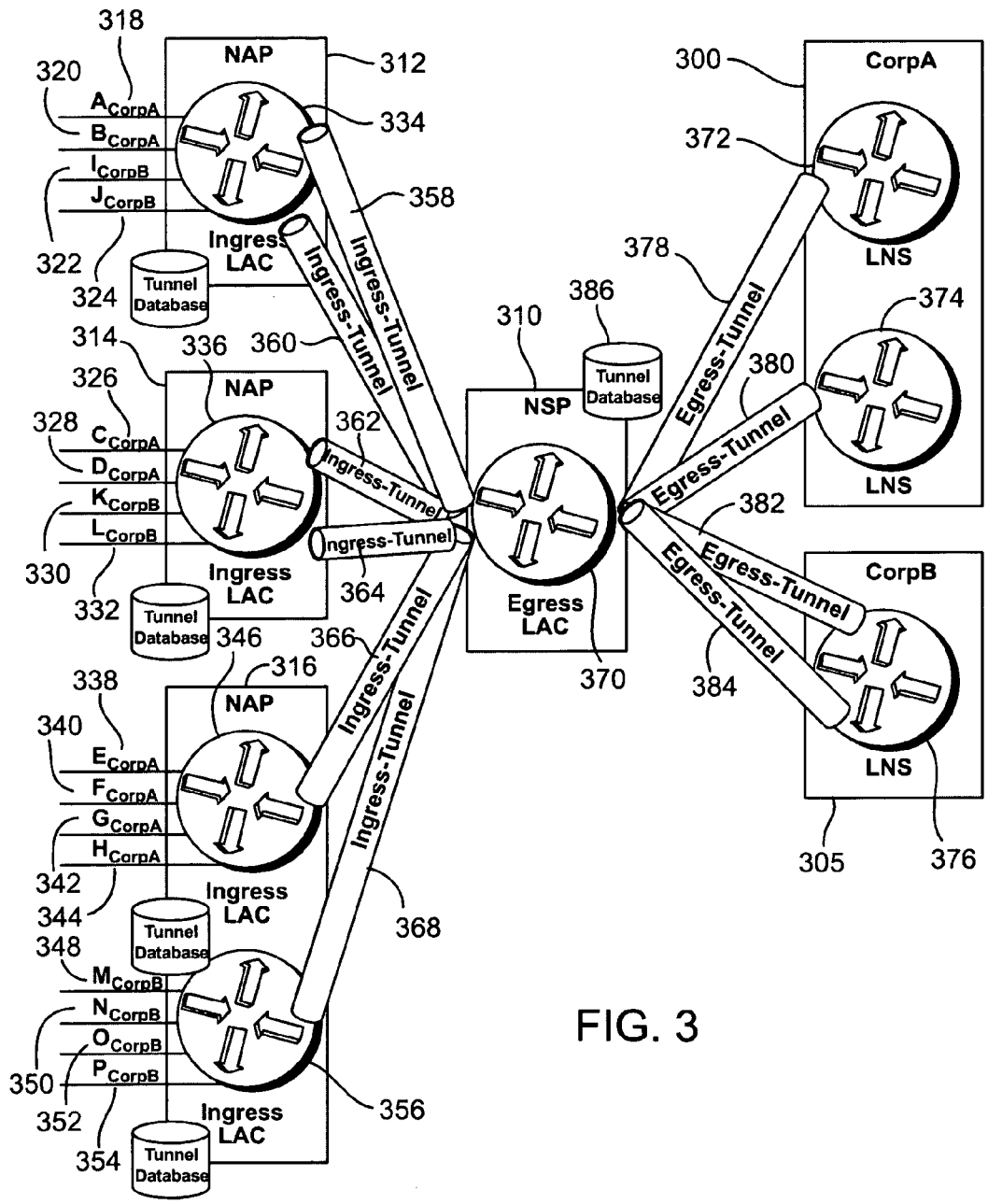
FIG. 3 is a block diagram that illustrates a system for dynamic ingress to egress tunnel mapping from a first communication network to a second communication network in accordance with one embodiment of the present invention.

FIG. 3 is a block diagram that illustrates a system for dynamic ingress to egress tunnel mapping in accordance with one embodiment of the present invention. CorpA 300 and CorpB 305 are remote domains with respect to NSP 310 and NAPs 312, 314 and 316. NAP 312 provides network access to user $A_{CorpA}$ 318, an employee of CorpA 300. NAP 312 also provides network access to users $B_{Corp}$ 320, $I_{CorpB}$ 322 and $J_{CorpB}$ 324 via ingress LAC 334. NAP 314 provides network access to users $C_{CorpA}$ 326, $D_{CorpA}$ 328, $K_{CorpB}$ 330 and $L_{CorpB}$ 332 via ingress LAC 336. NAP 316 provides network access to users $E_{CorpA}$ 338, $F_{CorpA}$ 340, $G_{CorpA}$ 342 and $H_{CorpA}$ 344 via ingress LAC 346. NAP 316 also provides network access to users $M_{CorpB}$ 348, $N_{CorpB}$ 350, $O_{CorpB}$ 352 and $P_{CorpB}$ 354 via ingress LAC 356. NAP 312 tunnels sessions to NSP 310 via tunnels 358 and 360. NAP 314 tunnels sessions to NSP 310 via tunnels 362 and 364, and NAP 316 tunnels sessions to NSP 310 via tunnels 366 and 368. Egress LAC 370 at NSP 310 serves as a LNS with respect to ingress LACs 334, 336, 346 and 356, while simultaneously serving as a LAC with respect to LNSs 372, 374 and 376. Egress LAC 370 receives tunneled sessions on ingress tunnels 358, 360, 362, 364, 366 and 368 and maps each session to one of egress tunnels 378, 380, 382 and 384. Tunnel database 386 includes tunnel selection criteria for remote domains 300 and 305. Tunnel database 386 also includes parameters for tunnels originating with egress LAC 370. Each NSP may have more than one egress LAC and each remote domain may have more than one LNS.

Figure 4:
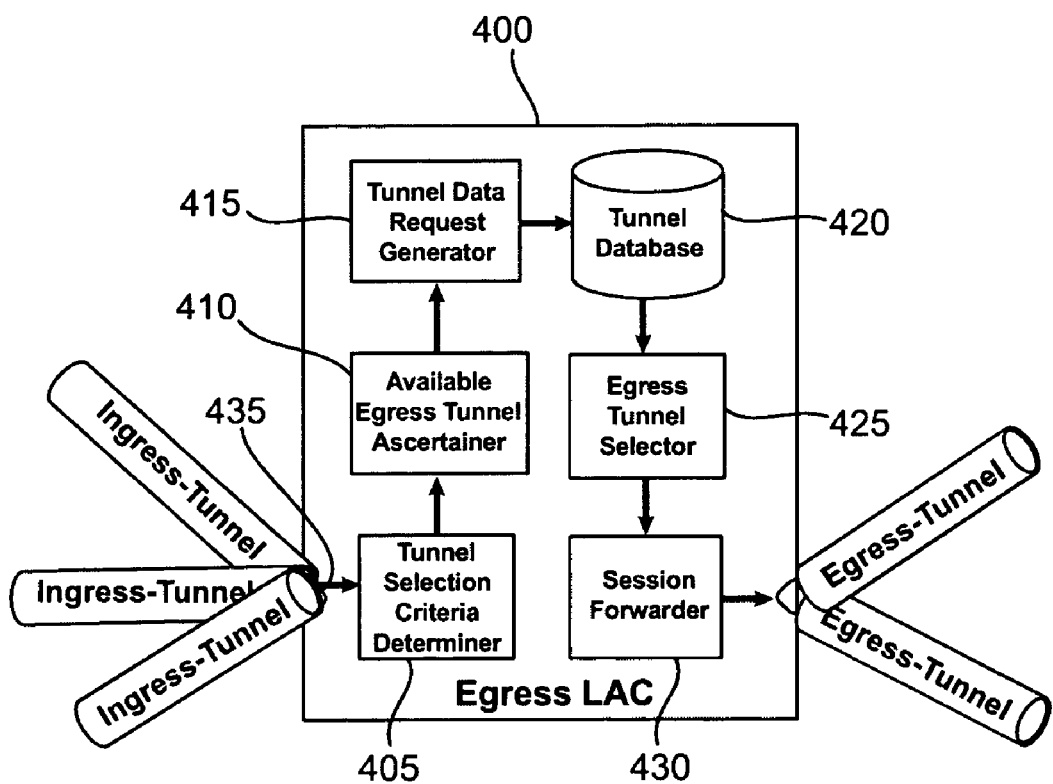
FIG. 4 is a block diagram that illustrates an apparatus for dynamic ingress to egress tunnel mapping from a first communication network to a second communication network in accordance with one embodiment of the present invention.

Turning now to FIG. 4, a block diagram that illustrates an apparatus for dynamic ingress to egress tunnel mapping in accordance with one embodiment of the present invention is presented. FIG. 4 provides more detail for egress LAC 370 in FIG. 3. Egress LAC 400 includes a tunnel selection criteria determiner 405, an available egress tunnel ascertainer 410, a tunnel data request generator 415, a tunnel database 420, an egress tunnel selector 425 and a session forwarder 430. The egress LAC 400 may be implemented using a Cisco 6400 (or an equivalent), available from Cisco Systems, Inc. of San Jose, Calif.

The tunnel selection criteria determiner 405 determines the criteria to apply in selecting a tunnel received by receiving interface 435. For example, the egress tunnel selection criteria determiner 405 may indicate that egress tunnels should be selected to evenly distribute sessions regardless of an egress tunnel's available bandwidth, or to select an egress tunnel having the most available bandwidth. The available egress tunnel ascertainer 410 determines which egress tunnels to a particular remote domain are available. The tunnel data request generator 415 generates one or more tunnel data requests to obtain the information requested by the available egress tunnel ascertainer 410. The tunnel database 420 stores parameters for each tunnel originating with LAC 400. The tunnel database 420 also stores tunnel selection criteria for each remote domain. Alternatively, tunnel parameters and tunnel selection criteria may be stored in separate databases. The egress tunnel selector 425 selects one of the egress tunnels leading to the remote domain and session forwarder 430 forwards the session received by receiving interface 435 to the remote domain via the egress tunnel selected by egress tunnel selector 425.

In operation, receiving interface 435 receives a session from a first communication network 440 and forwards the session to tunnel selection criteria determiner 405. The tunnel selection criteria determiner 405 determines the criteria to use in selecting a tunnel. According to a preferred embodiment, the selection criteria for a particular domain is obtained from a database upon receiving a first session destined for the remote domain. If the tunnel selection criteria are independent of tunnel loading, the egress tunnel selector 425 selects the tunnel indicated by the selection criteria determiner 405. If the tunnel selection determiner 405 requires tunnel-loading parameters, available egress tunnel ascertainer 410 ascertains the available egress tunnels to the remote domain. Egress tunnel selector 425 selects one of the tunnels to the remote domain by applying the tunnel selection criteria to the tunnel parameters and session forwarder 430 forwards the session received by receiving interface 435 to the remote domain via the tunnel selected by egress tunnel selector 425.

Figure 5:
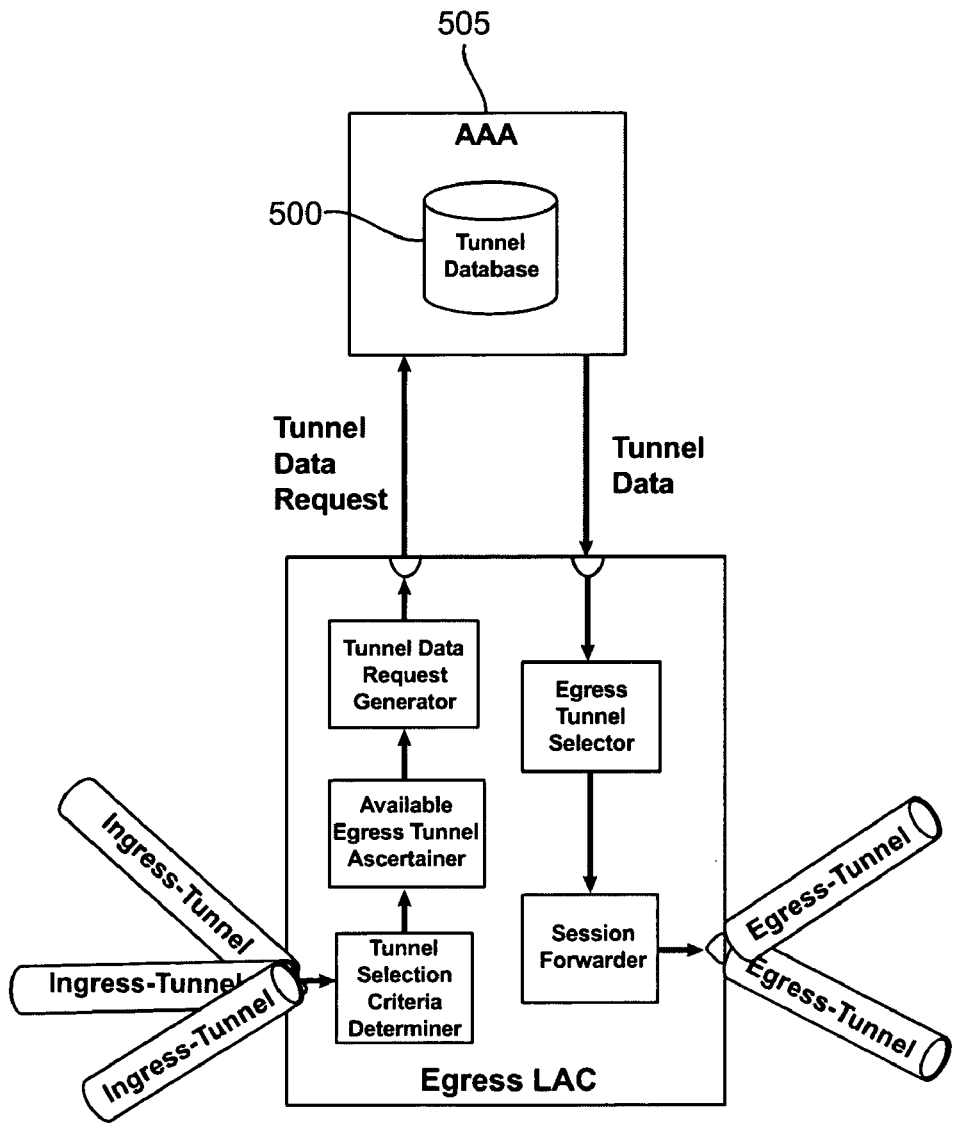
FIG. 5 is a block diagram that illustrates an apparatus for dynamic ingress to egress tunnel mapping from a first communication network to a second communication network in accordance with one embodiment of the present invention.

Turning now to FIG. 5, a block diagram that illustrates an apparatus for dynamic ingress to egress tunnel mapping in accordance with one embodiment of the present invention is presented. FIG. 5 is similar to FIG. 4, except tunnel data is maintained in an external database 500. According to one embodiment of the present invention, the tunnel data is stored in an AAA server 505.

Figure 6:
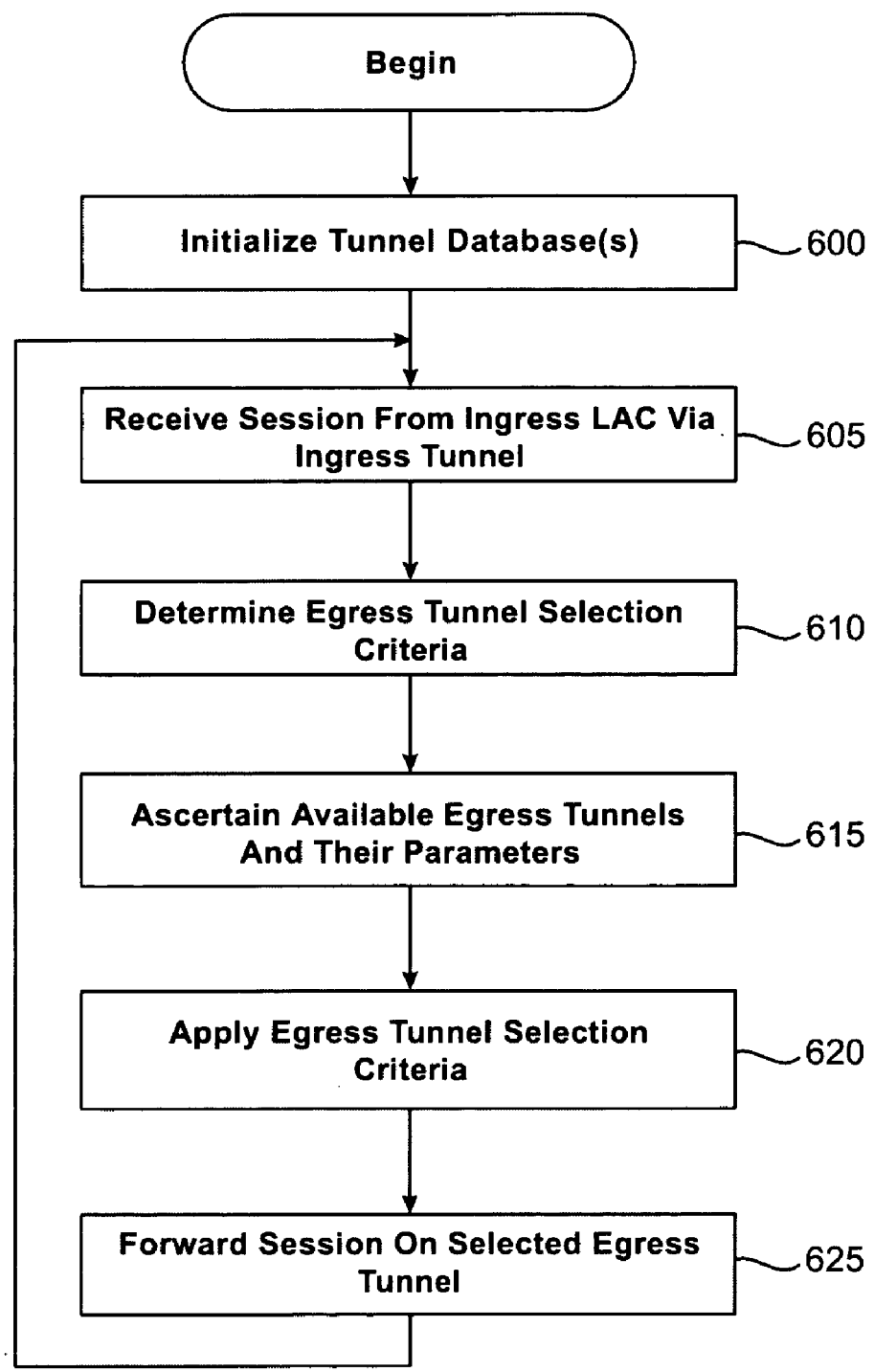
FIG. 6 is a flow diagram that illustrates a method for dynamic ingress to egress tunnel mapping from a first communication network to a second communication network in accordance with one embodiment of the present invention.

Turning now to FIG. 6, a flow diagram that illustrates a method for dynamic ingress to egress tunnel mapping in accordance with one embodiment of the present invention is presented. At 600, a tunnel database is initialized with tunnel selection criteria for each remote domain and with tunnel parameter values for each egress tunnel. For example, tunnel database 386 in FIG. 3 is initialized with tunnel selection criteria for remote domains 300 and 305. The selection criteria for remote domain 300 may indicate sessions should be allocated randomly, while the selection criteria for domain 305 may indicate sessions should be allocated based upon available bandwidth. In this example, tunnel database 386 also includes tunnel parameters needed for the particular egress tunnel selection criteria. The selection criteria for remote domain 300 require a list of egress tunnels to select from (e.g. egress tunnels 378 and 380). The selection criteria for remote domain 305 requires additional parameters such as the maximum number of sessions for each egress tunnel and the number of sessions currently allocated to each egress tunnel.

Referring again to FIG. 6, at 605, a session from an ingress LAC is received via an ingress tunnel. At 610, the egress tunnel selection criteria for the remote domain are determined. The selection criteria may be obtained from a local database or from an AAA server or the like. Various types of egress tunnel selection criteria are described below in more detail. At 615, a database is checked to ascertain the available egress tunnels to the remote domain and their respective parameters. For example, any tunnel that is "down," is not operational, or is operating over a certain percentage of its capacity could be considered "not available". One or more available tunnels may then be available at 615. At 620, the egress tunnel selection criteria obtained at reference numeral 610 is applied to the tunnel parameters for the available egress tunnels determined at reference numeral 615 to select an egress tunnel. At 625, the session is forwarded on the selected egress tunnel. Processing continues at 605 when another session is received on an ingress tunnel.

As mentioned above, the egress tunnel selection criteria may indicate that egress tunnels should be selected pseudo-randomly, or with a weighted random selection so that those with more available capacity are selected more often, or with any other suitable selection algorithm as will now be apparent to those of ordinary skill in the art. More examples of selection criteria are presented below with reference to FIGS. 7–17.

Figure 7:
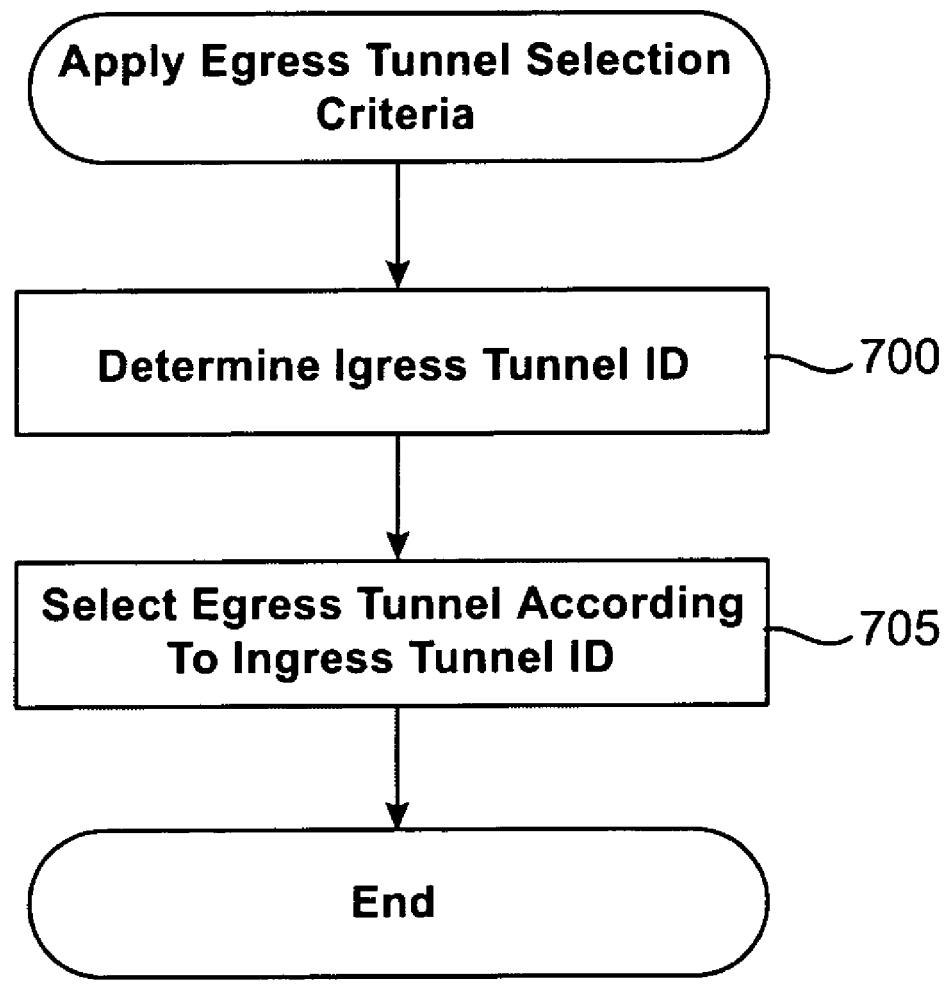
FIG. 7 is a flow diagram that illustrates a method for selecting an egress tunnel based upon an ingress tunnel ID accordance with one embodiment of the present invention.

In accordance with one embodiment of the present invention, an ingress tunnel ID is used to select an egress tunnel for a session. This is illustrated in FIG. 7. At 700, the ID of the ingress tunnel that includes the received session is determined. At 705, an egress tunnel is selected based upon the ingress tunnel ID. For example, a session in an ingress tunnel associated with a relatively high level of service may be allocated to a special egress tunnel for sessions requiring a similar of service. Alternatively, the session may be allocated to any other egress tunnel capable of providing the required level of service.

Figure 8:
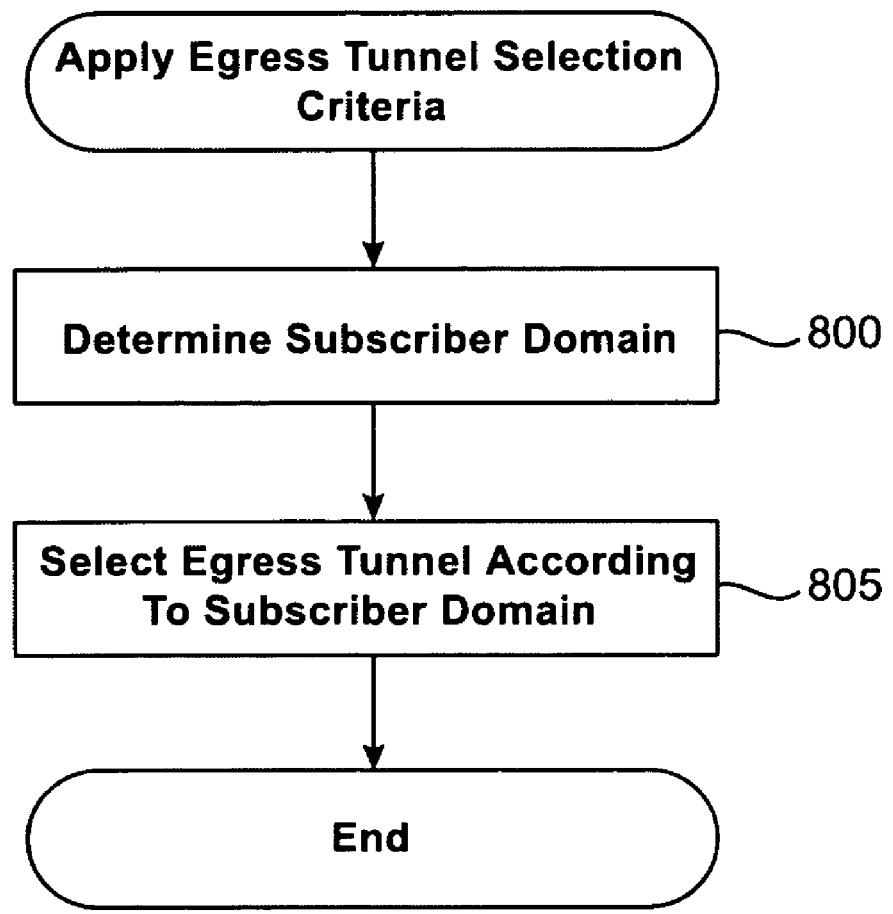
FIG. 8 is a flow diagram that illustrates a method for selecting an egress tunnel based upon a subscriber domain in accordance with one embodiment of the present invention.

In accordance with another embodiment of the present invention, a subscriber domain associated with the received session is used to select an egress tunnel for a session. This is illustrated in FIG. 8. At 800, the subscriber domain for the received session is determined. At 805, an egress tunnel is selected based upon the subscriber domain. For example, subscribers of domain xyz.net may be accorded a relatively high level of service. Thus, a session in an ingress tunnel associated with a subscriber from the xyz.net domain may be allocated to a special egress tunnel for sessions requiring a similar of service. Alternatively, the session may be allocated to any other egress tunnel capable of providing the required level of service.

Figure 9:
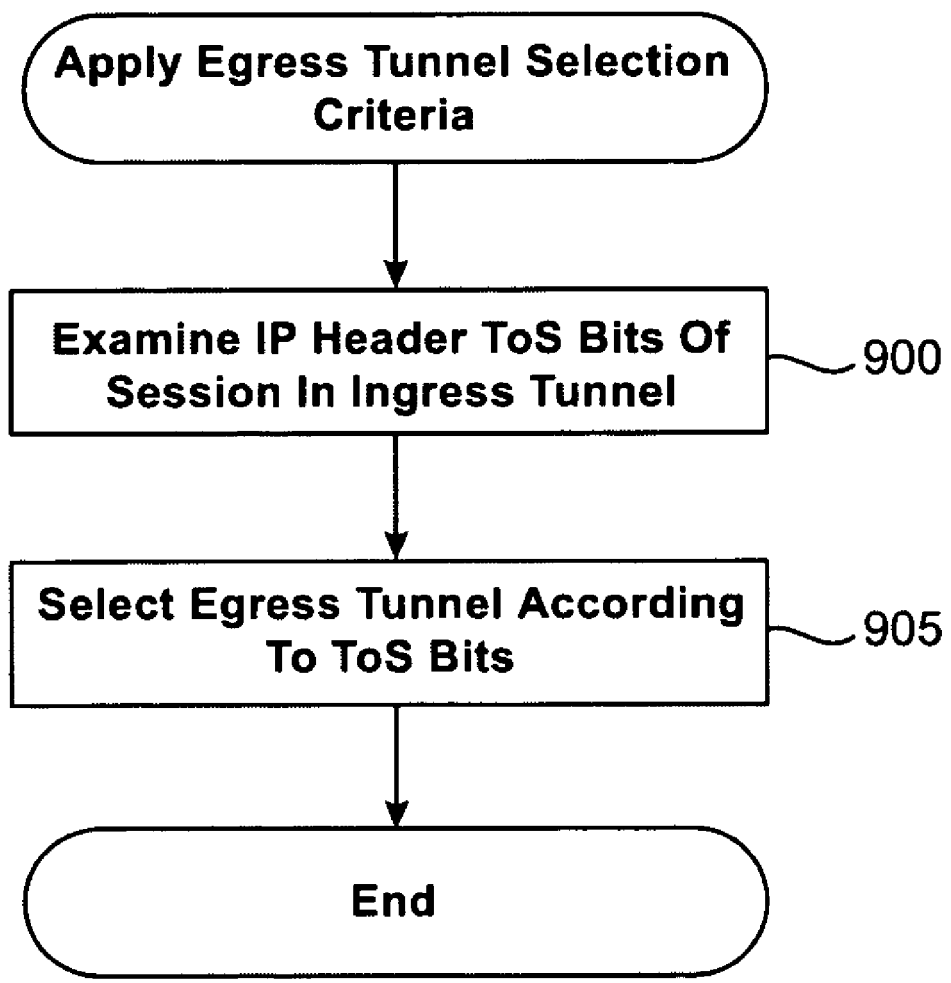
FIG. 9 is a flow diagram that illustrates a method for selecting an egress tunnel based upon Internet Protocol (IP) packet header Type of Service (ToS) bits in accordance with one embodiment of the present invention.

In accordance with one embodiment of the present invention, the three Precedence bits (the three highest order or most significant bits of the 8-bit Type of Service (ToS)/Differentiated Services Field of the IP packet header) are used to select an egress tunnel for a session. This is illustrated in FIG. 9. At 900, the ToS bits are examined. At 905, an egress tunnel is selected based upon the ToS bits. For example, a session whose ToS bits indicate a relatively high level of service may be allocated to a special egress tunnel for sessions requiring a similar of service. Alternatively, the session may be allocated to any other egress tunnel capable of providing the required level of service.

Those of ordinary skill in the art will realize that the particular bits used are not particularly critical, for example, the CoS (Class of Services) bits of an IEEE 802.1q frame could be used as could the CoS bits in an Inter-Switch Link (ISL) frame. Other bits or fields could also be designated to carry the type of service information. A 3-bit ToS permits up to 8 levels of service. Larger bit fields would be used if desired.

Figure 10:
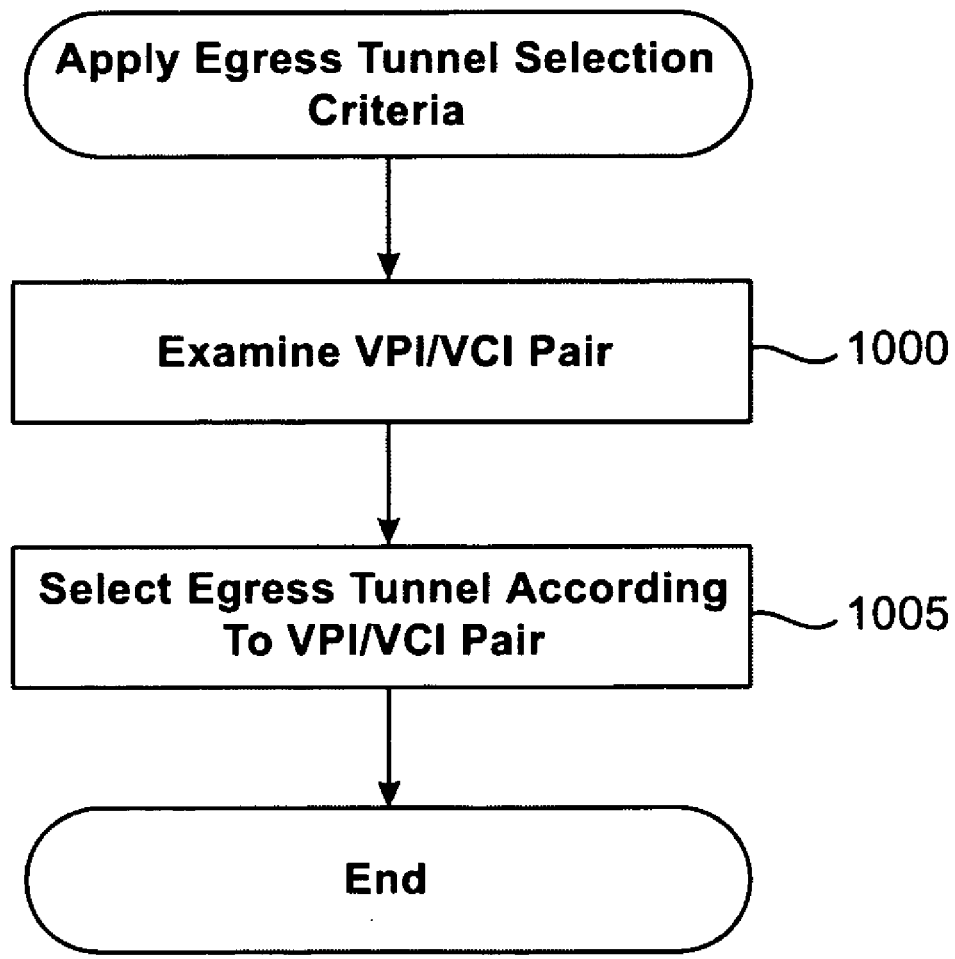
FIG. 10 is a flow diagram that illustrates a method for selecting an egress tunnel based upon a Virtual Path Identifier (VPI)/Virtual Circuit Identifier (VCI) pair in accordance with one embodiment of the present invention.

According to another embodiment of the present invention, egress tunnel selection is based upon a VPI/VCI pair associated with the received session. This is illustrated in FIG. 10. As is known to those of ordinary skill in the art, a virtual circuit or channel (VC) is a logical circuit created to ensure reliable communication between two network devices. A VC is defined by a Virtual Path Identifier (VPI)/ Virtual Channel Identifier (VCI) pair. According to this embodiment of the present invention, at 1000, a VPI/VCI pair associated with the received session is examined. At 1005, an egress tunnel is selected based upon the VPI/VCI pair. For example, a session whose VPI/VCI pair indicates a relatively high level of service may be allocated to a special egress tunnel for sessions requiring a similar of service. Alternatively, the session may be allocated to any other egress tunnel capable of providing the required level of service.

Figure 11:
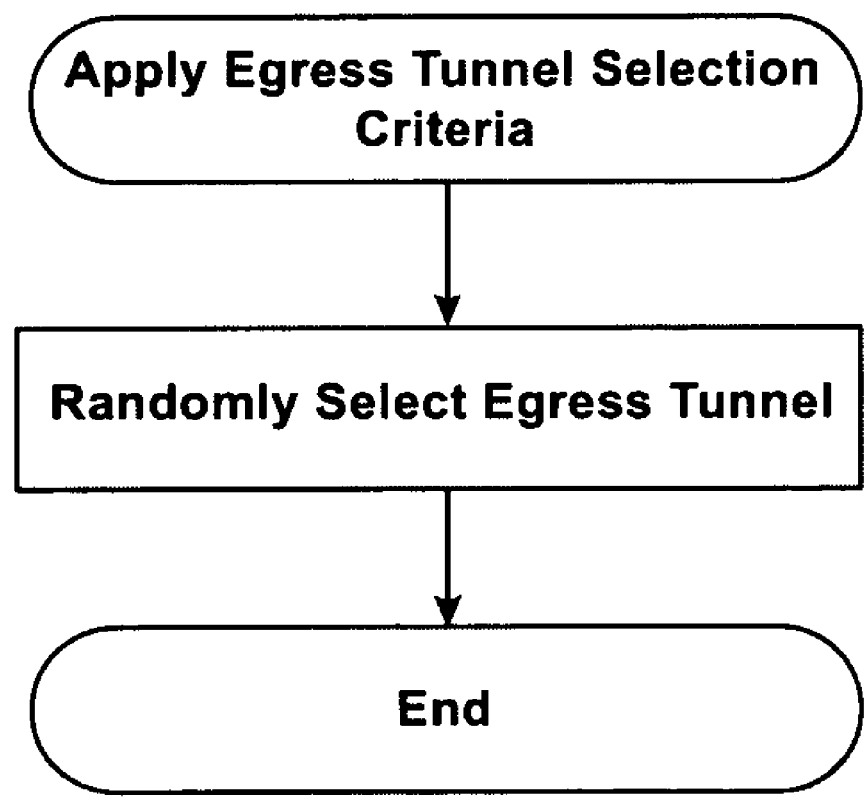
FIG. 11 is a flow diagram that illustrates a method for selecting an egress tunnel based upon a pseudo-random process in accordance with one embodiment of the present invention.

According to another embodiment of the present invention, an egress tunnel is selected based upon a pseudo-random process. This is illustrated in FIG. 11. For example, suppose an egress LAC has ten egress tunnels to a remote domain and each egress tunnel is identified by a number from one to ten. A random number generator is used to generate a number from one to ten and the egress tunnel associated with the generated number is selected.

According to another embodiment of the present invention, the time at which a session is received is used to select an egress tunnel. A remote domain may have multiple LNSs in various parts of the world. The workload for each LNS may vary depending upon the time of day, the day of the week, or both. Thus, allocating a session to an egress tunnel associated with a LNS at an "off-hours" site results in a relatively efficient utilization of resources. This embodiment is described below in more detail with reference to FIG. 12.

Figure 12:
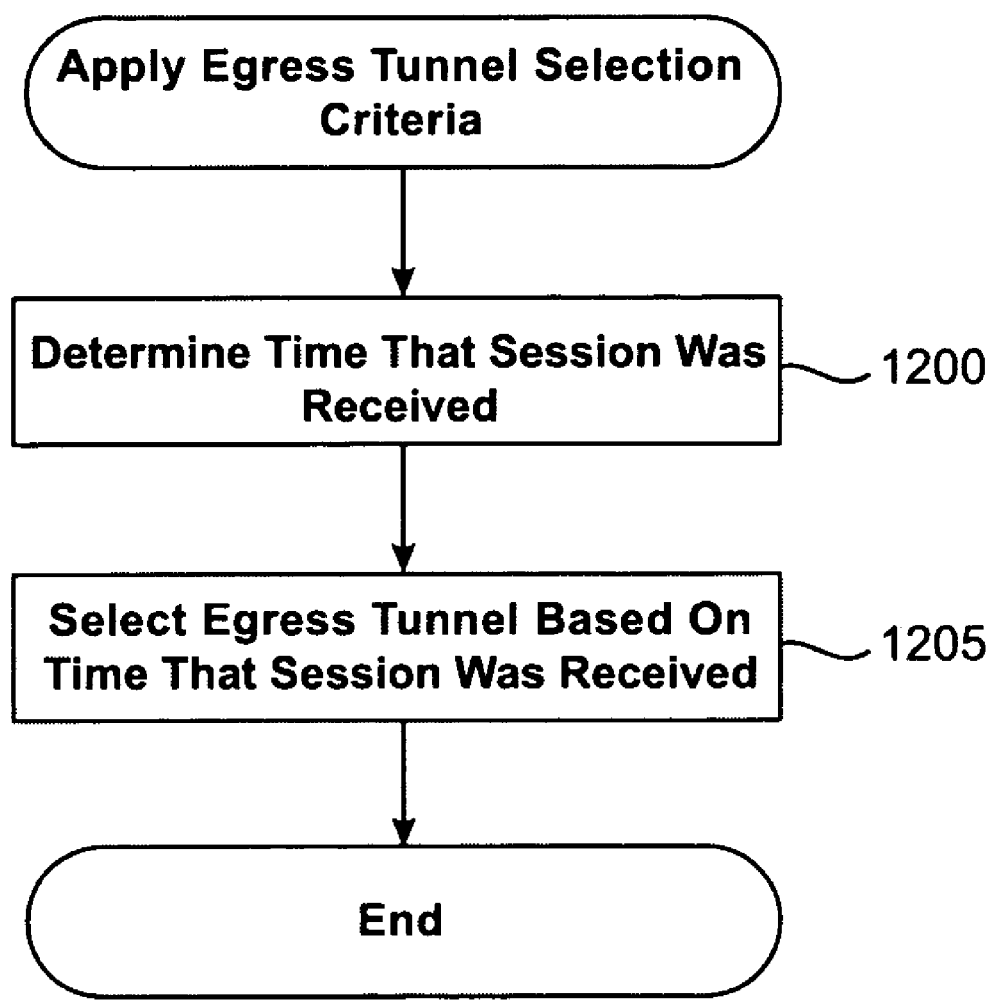
FIG. 12 is a flow diagram that illustrates a method for selecting an egress tunnel based upon the time at which a session is received in accordance with one embodiment of the present invention.

Turning now to FIG. 12, a flow diagram that illustrates a method for selecting an egress tunnel based upon the time at which a session is received in accordance with one embodiment of the present invention is presented. At 1200, the time at which the session is received is determined. At 1205, the egress tunnel is selected based upon the time the session is received. For example, suppose an egress LAC that receives a session is in country A and that the remote domain has LNSs in country A and country B. Country A is in a time zone that is 12 hours ahead of country B. The egress LAC receives a session at 10 AM on a Monday in the egress LAC's time zone, which is 10 PM on a Sunday in Country B. In this case, the LNS in Country A will likely have a higher workload than CorpA's LNS in country B. This information is accounted for in an egress tunnel parameter value.

According to embodiments of the present invention, the available bandwidth of egress tunnels and associated interfaces is used either alone or in combination with other parameters to dynamically select an egress tunnel. The selection criteria are applied to the various egress tunnel parameters to create a loading factor. The egress tunnel with the best loading factor is selected. These embodiments are illustrated below with reference to FIGS. 13–16.

Figure 13:
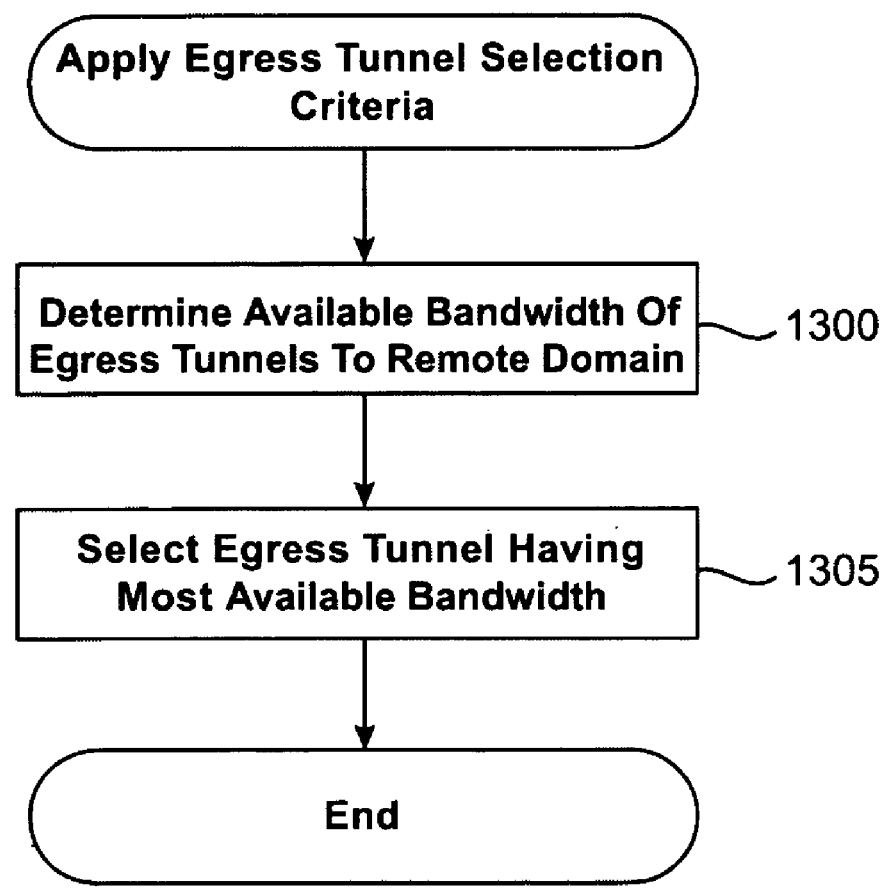

According to one embodiment of the present invention, the available bandwidth of all egress tunnels going to a remote domain is used to select an egress tunnel. This is illustrated in FIG. 13. At 1300, the available bandwidth of all egress tunnels going to the remote domain is determined. At 1305, the egress tunnel having the most available bandwidth is selected. The available bandwidth may be expressed, by way of example, as the maximum number of sessions for an egress tunnel minus the number of active sessions. The maximum number may be hard-coded, or based on the number of sessions the egress tunnel has recently been able to support while maintaining a certain level of service.

The load factor information may be of a number of types, but essentially is an indicator of the available capacity of the particular egress tunnel, weighted by various egress tunnel parameters. In this manner it is now relatively straightforward to program an egress LAC to load balance among the multiple instances of egress tunnels for a remote domain given in the database.

For example, one way to implement the system illustrated in FIG. 3 is to provision $Corp_A$ 300 with a number of egress tunnels for handling sessions and to set the selection criteria such that the egress tunnel with the most available bandwidth is selected. Suppose each egress tunnel is capable of handling up to "X" sessions and currently has two active sessions. In this case, its load factor is X-2. The egress LAC 370 at the NSP's domain can keep track of all sessions passed to these respective egress tunnels so that it can avoid allocating more sessions than any particular egress tunnel can handle. It can also load balance among multiple instances of the egress tunnels so that the load is shared more or less equally. This can be done pseudo randomly or in any other practical manner. Now the load can be balanced and egress tunnels that are unable to handle sessions can be avoided to minimize the risk of a dropped tunnel, and to minimize the risk of violating a SLA.

According to one embodiment of the present invention, the available bandwidth is weighted by the processing capacity of the LNS CPU. For example, suppose egress tunnel A is currently handling 10 sessions and is associated with a remote domain LNS having a relatively high capacity CPU. Suppose also that egress tunnel B is currently handling the same number of sessions and is associated with a remote domain LNS having a relatively low capacity CPU. In this case, egress tunnel A is better equipped to handle an additional session than egress tunnel B. This information is accounted for in the egress tunnel parameters for egress tunnel A and egress tunnel B.

Figure 14:
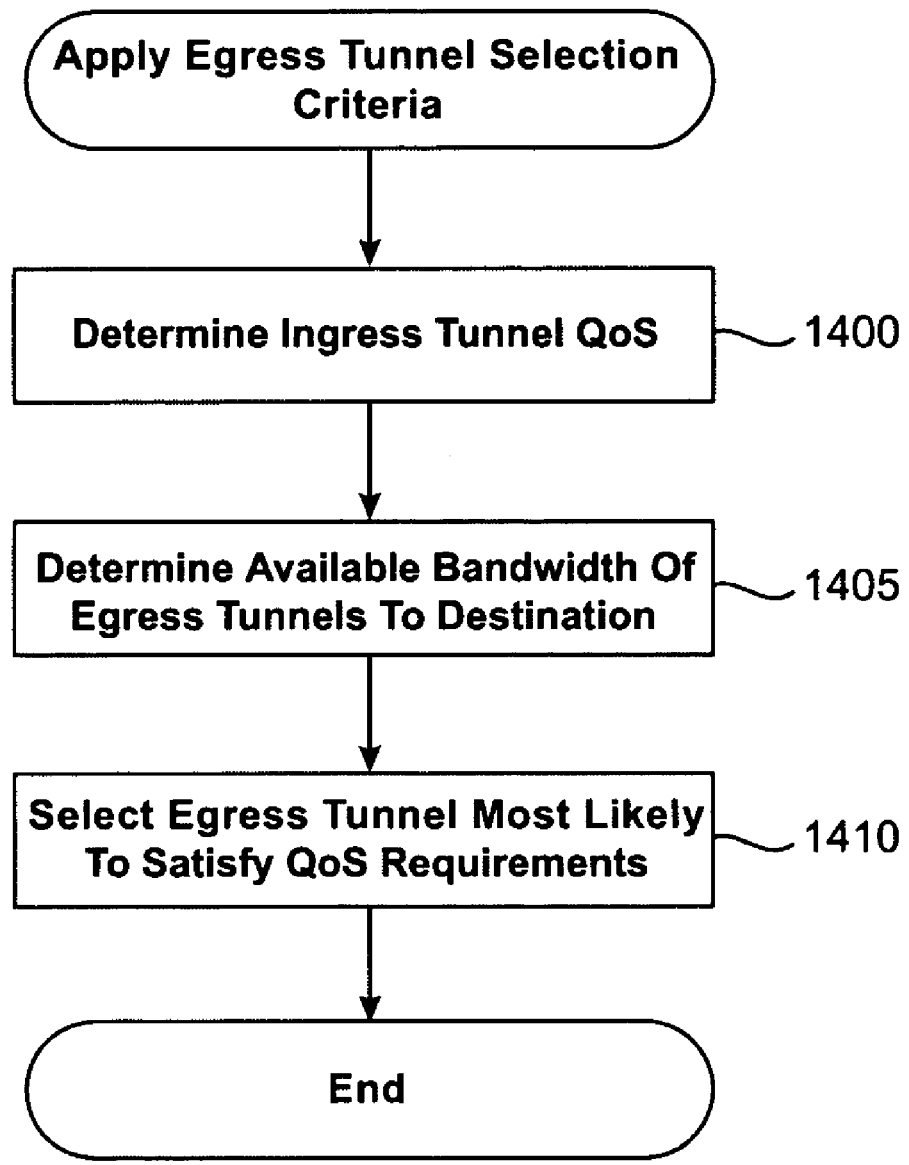
FIG. 14 is a flow diagram that illustrates a method for selecting an egress tunnel based upon available bandwidth and an ingress tunnel QoS in accordance with one embodiment of the present invention.

According to another embodiment of the present invention, an egress tunnel is selected based upon available bandwidth and an ingress tunnel QoS. This is illustrated in FIG. 14. At 1400, the QoS of the ingress tunnel that includes the received session is determined. The QoS of ingress tunnels may be stored, by way of example, in a tunnel database that is indexed by a tunnel ID. At 1405, the available bandwidth of egress tunnels going to the remote domain is determined. At 1410, the egress tunnel having an amount of bandwidth most appropriate for the required level of service is selected.

Figure 15:
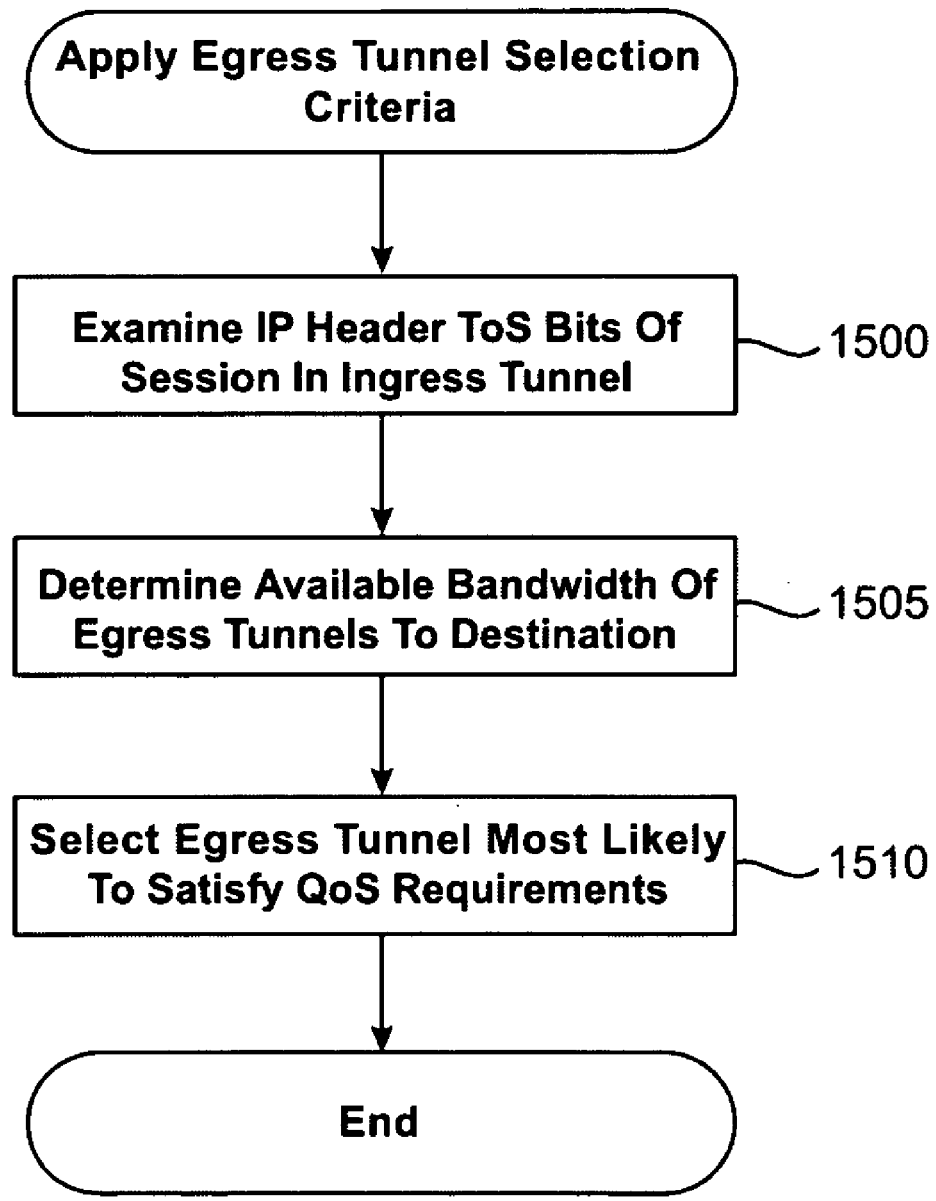
FIG. 15 is a flow diagram that illustrates a method for selecting an egress tunnel based upon available bandwidth and IP header ToS bits in accordance with one embodiment of the present invention.

According to one embodiment of the present invention, an egress tunnel is selected based upon available bandwidth and IP header ToS bits. This is illustrated in FIG. 15. At 1500, the ToS bits for an IP header associated with a session is examined. At 1505, the available bandwidth of egress tunnels going to the remote domain is determined. At 1510, the egress tunnel having an amount of available bandwidth most appropriate for the required level of service is selected.

Figure 16:
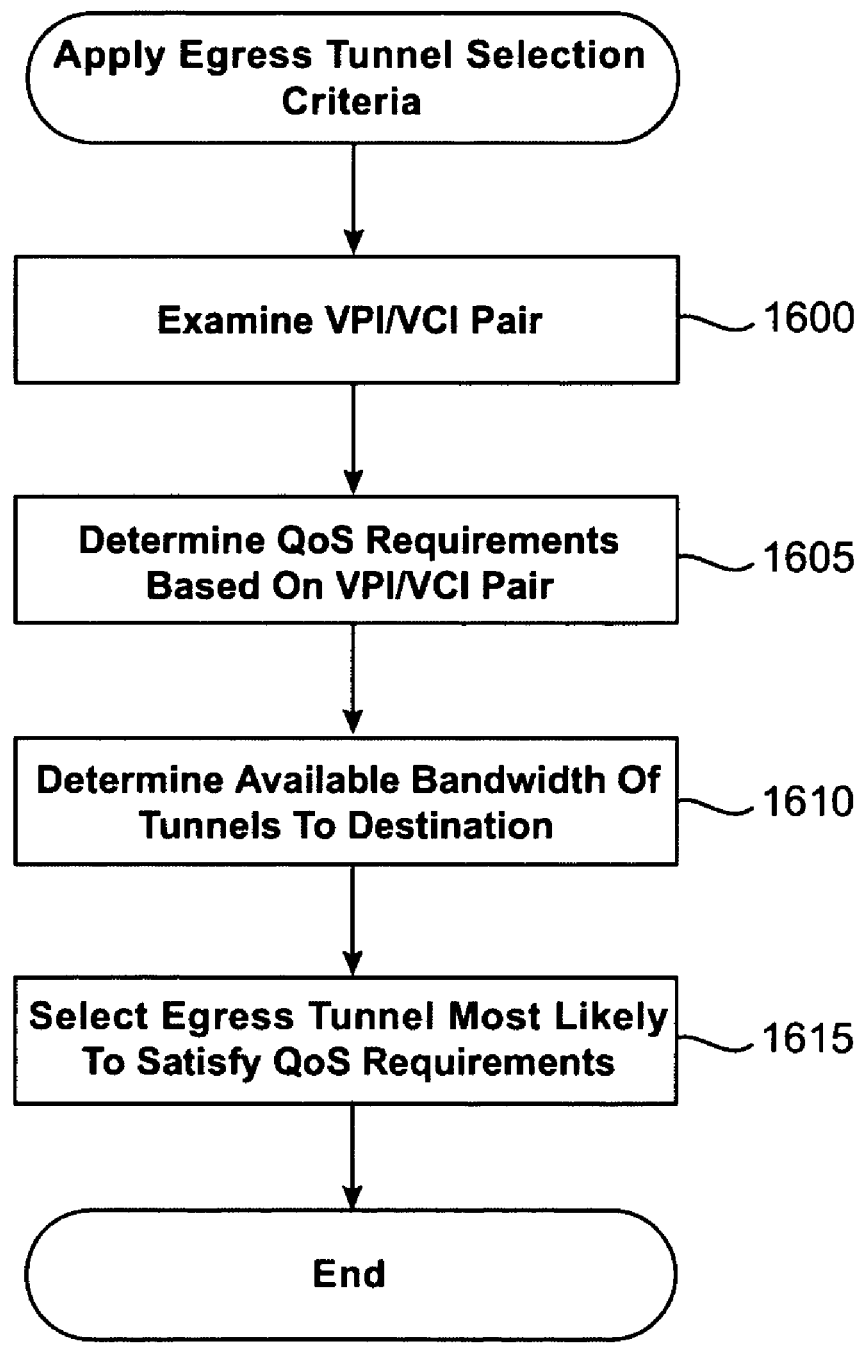
FIG. 16 is a flow diagram that illustrates a method for selecting an egress tunnel based upon available bandwidth and a VPI/VCI pair in accordance with one embodiment of the present invention.

Similarly, a VPI/VCI pair may also be used in conjunction with available bandwidth to select an egress tunnel in accordance with another embodiment of the present invention. Referring to FIG. 16, at 1600, a VPI/VCI pair associated with a session is examined. At 1605, a level of service is determined based upon the VPI/VCI pair. At 1610, the available bandwidth of egress tunnels going to the remote domain is determined. At 1615, the egress tunnel having an amount of available most appropriate for the level of service is selected.

Figure 17:
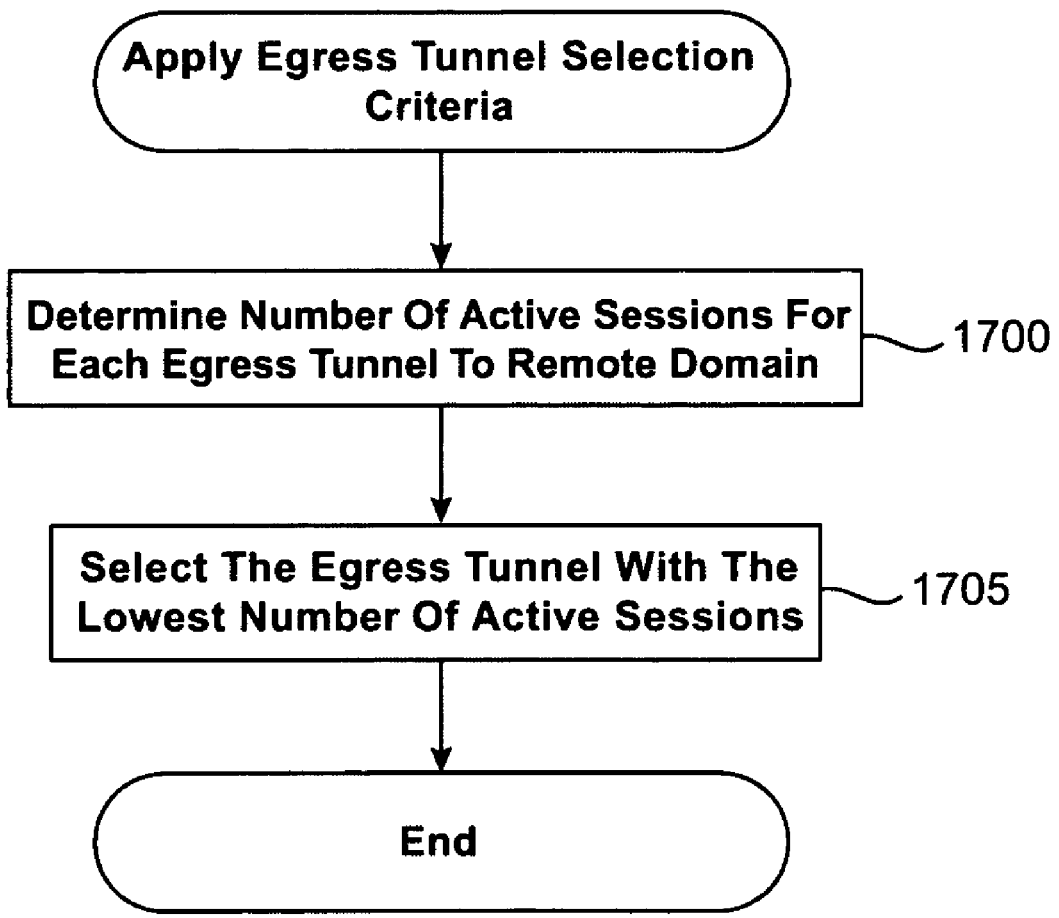
FIG. 17 is a flow diagram that illustrates a method for selecting an egress tunnel to even the distribution of sessions among egress tunnels in accordance with one embodiment of the present invention.

According to another embodiment of the present invention, an egress tunnel is selected to provide a relatively even distribution of sessions among egress tunnels, regardless of egress tunnel capacity. This is illustrated in FIG. 17. At 1700, the number of active sessions for each egress tunnel to the remote domain is determined. At 1705, the egress tunnel having the smallest number of active sessions is selected. For example, suppose egress tunnels A and B go to the remote domain and that egress tunnel A has 10 active sessions while egress tunnel B has 5 active sessions. According to this embodiment of the present invention, each new session is added to egress tunnel B until egress tunnel B has more active sessions than egress tunnel A.

According to another embodiment of the present invention, an ingress LAC is instructed to route incomming sessions on a tunnel to an alternate egress LAC when a primary egress LAC exceeds a predetermined loading level. This is illustrated below with reference to FIG. 18.

Figure 18:
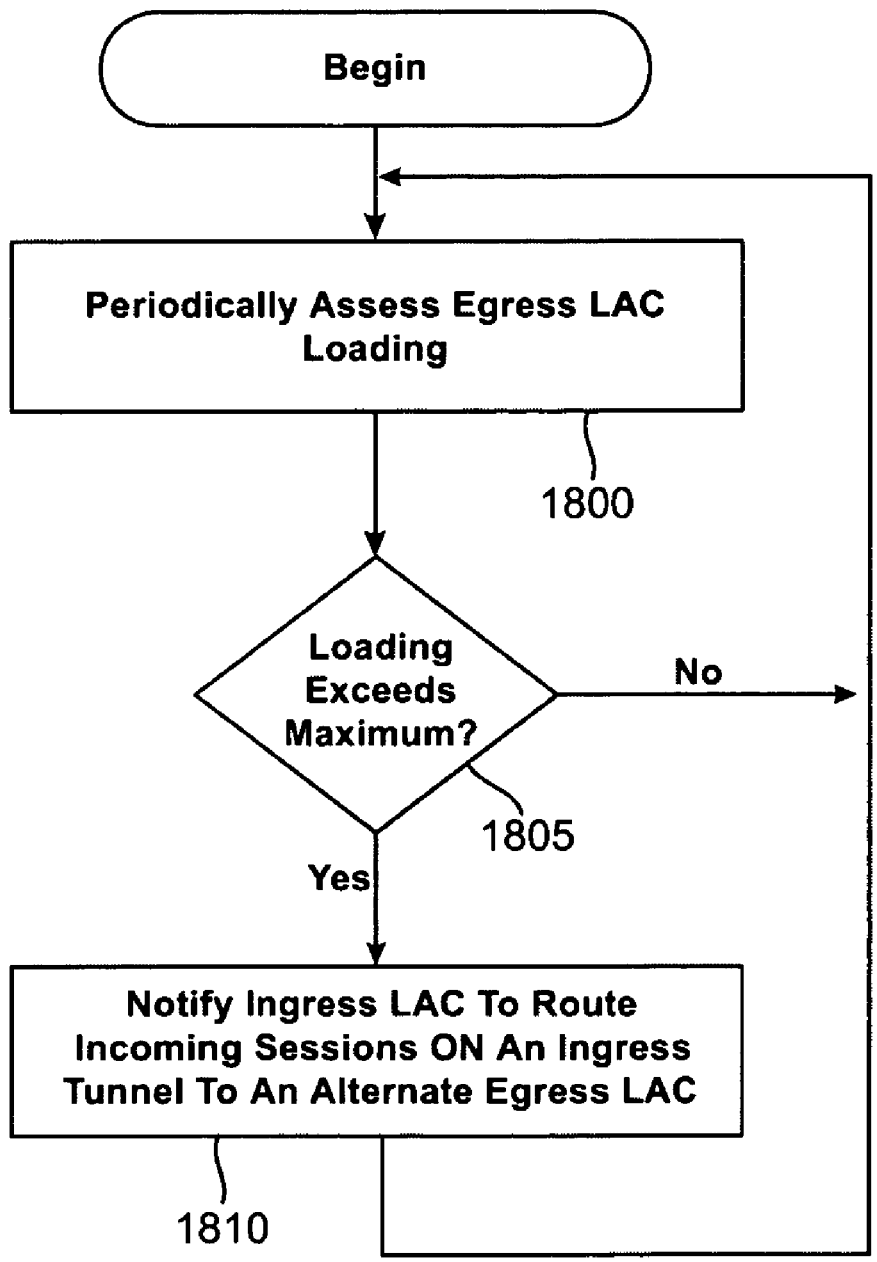
FIG. 18 is a flow diagram that illustrates a method for diverting tunneled sessions away from an overloaded egress LAC in accordance with one embodiment of the present invention.

Turning now to FIG. 18, a flow diagram that illustrates a method for diverting tunneled sessions away from an overloaded egress LAC in accordance with one embodiment of the present invention is presented. At 1800, egress LAC loading is periodically assessed. At 1805, a determination is made regarding whether the egress LAC loading has exceeded a predetermined threshold. If the egress LAC has exceeded the predetermined threshold, at 1810, an ingress LAC is instructed to route incoming sessions on an ingress tunnel to an alternate egress LAC, thus providing relatively efficient utilization of resources and reducing the likelihood of violating a SLA.

A LAC having the capabilities described above can be further used to allow the NSP to behave in a fundamentally different manner than before. Now the NSP can differentiate among computer users. For example, in the case of Joe@ISP.net who is an authorized user of CorpA, the NSP can identify the user at the time the NSP receives his session, look up the details of the SLA with that user, and determine which egress tunnel to the remote domain can best service the session given the requirements of the SLA.

An example of this mode of operation is now presented with reference to FIG. 3. A PoP (Point of Presence) of a NAP 312 is contacted by a user via a PPP connection or another suitable connection. The PPP session is directed to a NSP 312. The NSP 312 seeks to identify the user with the local AAA server. Instead of performing standard authentication, the AAA server can now perform a query to its tunnel database 386 to determine the "best" egress tunnel that fits the SLA between the NAP 312 and the NSP 310 as well as the SLA between the NSP 310 and the remote domain 300. Assuming that an egress tunnel between the NSP 310 and the remote domain 300 fits the parameters, the session is allocated to the egress tunnel.

Dynamically mapping ingress tunnels to egress tunnels in accordance with embodiments of the present invention also increases scalability by allowing a NSP to share an egress LAC among multiple remote domains without manually reconfiguring the network.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for dynamic ingress to egress tunnel mapping on a communication network, the method comprising:

receiving a tunneled communication from a subscriber using a first communication network, said first communication network connected to at least one communication network by at least one egress tunnel communicatively coupled to a remote domain;

determining egress tunnel selection criteria for said tunneled communication, said egress tunnel selection criteria indicating a basis for selecting one of said at least one egress tunnel, said determining based at least in part on a tunnel database comprising selection criteria for at least one egress tunnel connecting said first communication network to said at least one communication network;

selecting one of said at least one egress tunnel based on said egress tunnel selection criteria; and forwarding said tunneled communication on the selected egress tunnel.

2. The method of claim 1, further comprising initializing a tunnel database that includes tunnel selection criteria for at least one egress tunnel connecting said first communication network to said at least one communication network.

3. The method of claim 1 wherein said tunneled communication comprises a Point-to-Point Protocol (PPP) session.

4. The method of claim 3 wherein said tunnels comprise L2TP tunnels.

5. The method of claim 4 wherein said selecting further comprises:

determining an ingress tunnel ID for said tunneled session, said ingress tunnel ID uniquely identifying an ingress tunnel including said PPP session; and selecting one of said one or more available egress tunnels based on said ingress tunnel ID.

6. The method of claim 4 wherein said selecting further comprises:

determining a subscriber domain for said tunneled session; and selecting one of said one or more available egress tunnels based on said subscriber domain.

7. The method of claim 4 wherein said selecting further comprises:

examining Type of Service (ToS) bits associated with said PPP session; and selecting one of said one or more available egress tunnel based on said ToS bits.

8. The method of claim 4 wherein said selecting further comprises:

examining a Virtual Path Identifier (VPI)/Virtual Channel Identifier (VCI) pair associated with said PPP session; and selecting one of said one or more available egress tunnel based on said VPI/VCI pair.

9. The method of claim 4 wherein said selecting further comprises randomly selecting one of said one or more available egress tunnel connected to said remote domain.

10. The method of claim 4 wherein said selecting further comprises:

determining available bandwidth for at least one egress tunnel to said remote domain; and selecting one of said one or more available egress tunnel to said remote domain having the most available bandwidth.

11. The method of claim 4 wherein said selecting further comprises:

determining a time at which said PPP session is received; and selecting one of said one or more available egress tunnel based on said time.

12. The method of claim 4 wherein said selecting further comprises:

determining a time at which said PPP session is received;

determining available bandwidth for at least one egress tunnel to said remote domain; and selecting one of said one or more available egress tunnel having the most available bandwidth at said time.

13. The method of claim 4 wherein said selecting further comprises:
examining Type of Service (ToS) bits associated with said PPP session;
determining available bandwidth for at least one egress tunnel to said remote domain; and
selecting one of said one or more available egress tunnel based on said ToS bits and said available bandwidth.

14. The method of claim 4 wherein said selecting further comprises:
examining a Virtual Path Identifier (VPI)/Virtual Channel Identifier (VCI) pair associated with said PPP session;
determining a class of service based on said VPI/VCI pair;
determining available bandwidth for at least one egress tunnel to said remote domain; and
selecting one of said one or more available egress tunnel based on said class of service and said available bandwidth.

15. The method of claim 4 wherein said selecting further comprises selecting one of said one or more available egress tunnel to said remote domain having the smallest number of tunneled sessions such that tunneled sessions are distributed evenly among egress tunnels to said remote domain.

16. A program storage device readable by a machine, embodying a program of instructions executable by the machine to perform a method to dynamically map ingress to egress tunnels on a communication network, the method comprising:
receiving a tunneled communication from a subscriber using a first communication network, said first communication network connected to at least one communication network by at least one egress tunnel communicatively coupled to a remote domain;
determining egress tunnel selection criteria for said tunneled communication, said egress tunnel selection criteria indicating a basis for selecting one of said at least one egress tunnel, said determining based at least in part on a tunnel database comprising selection criteria for at least one egress tunnel connecting said first communication network to said at least one communication network;
selecting one of said at least one egress tunnel based on said egress tunnel selection criteria; and
forwarding said tunneled communication on the selected egress tunnel.

17. The program storage device of claim 16 wherein said method further comprises initializing a tunnel database that includes tunnel selection criteria for at least one egress tunnel connecting said first communication network to said at least one communication network.

18. The program storage device of claim 16 wherein said tunneled communication comprises a Point-to-Point Protocol (PPP) session.

19. The program storage device of claim 18 wherein said tunnels comprise L2TP tunnels.

20. The program storage device of claim 19 wherein said selecting further comprises:
determining an ingress tunnel ID for said tunneled session, said ingress tunnel ID uniquely identifying an ingress tunnel including said PPP session; and
selecting one of said one or more available egress tunnels based on said ingress tunnel ID.

21. The program storage device of claim 19 wherein said selecting further comprises:
determining a subscriber domain for said tunneled session; and
selecting one of said one or more available egress tunnels based on said subscriber domain.

22. The program storage device of claim 19 wherein said selecting further comprises:
examining Type of Service (ToS) bits associated with said PPP session; and
selecting one of said one or more available egress tunnel based on said ToS bits.

23. The program storage device of claim 19 wherein said selecting further comprises:
examining a Virtual Path Identifier (VPI)/Virtual Channel Identifier (VCI) pair associated with said PPP session; and
selecting one of said one or more available egress tunnel based on said VPI/VCI pair.

24. The program storage device of claim 19 wherein said selecting further comprises randomly selecting one of said one or more available egress tunnel connected to said remote domain.

25. The program storage device of claim 19 wherein said selecting further comprises:
determining available bandwidth for at least one egress tunnel to said remote domain; and
selecting one of said one or more available egress tunnel to said remote domain having the most available bandwidth.

26. The program storage device of claim 19 wherein said selecting further comprises:
determining a time at which said PPP session is received; and
selecting one of said one or more available egress tunnel based on said time.

27. The program storage device of claim 19 wherein said selecting further comprises:
determining a time at which said PPP session is received;
determining available bandwidth for at least one egress tunnel to said remote domain; and
selecting one of said one or more available egress tunnel having the most available bandwidth at said time.

28. The program storage device of claim 19 wherein said selecting further comprises:
examining Type of Service (ToS) bits associated with said PPP session;
determining available bandwidth for at least one egress tunnel to said remote domain; and
selecting one of said one or more available egress tunnel based on said ToS bits and said available bandwidth.

29. The program storage device of claim 19 wherein said selecting further comprises:
examining a Virtual Path Identifier (VPI)/Virtual Channel Identifier (VCI) pair associated with said PPP session;
determining a class of service based on said VPI/VCI pair;
determining available bandwidth for at least one egress tunnel to said remote domain; and
selecting one of said one or more available egress tunnel based on said class of service and said available bandwidth.

30. The program storage device of claim 19 wherein said selecting further comprises selecting one of said one or more available egress tunnel to said remote domain having the smallest number of tunneled sessions such that tunneled sessions are distributed evenly among egress tunnels to said remote domain.

31. An apparatus for dynamic ingress to egress tunnel mapping on a communication network, the apparatus comprising:

means for receiving a tunneled communication from a subscriber using a first communication network, said first communication network connected to at least one communication network by at least one egress tunnel communicatively coupled to a remote domain;

means for determining egress tunnel selection criteria for said tunneled communication, said egress tunnel selection criteria indicating a basis for selecting one of said at least one egress tunnel, said means for determining based at least in part on a tunnel database comprising selection criteria for at least one egress tunnel connecting said first communication network to said at least one communication network;

means for selecting one of said at least one egress tunnel based on said egress tunnel selection criteria; and means for forwarding said tunneled communication on the selected egress tunnel.

32. The apparatus of claim 31, further comprising means for initializing a tunnel database that includes tunnel selection criteria for at least one egress tunnel connecting said first communication network to said at least one communication network.

33. The apparatus of claim 31 wherein said tunneled communication comprises a Point-to-Point Protocol (PPP) session.

34. The apparatus of claim 33 wherein said tunnels comprise L2TP tunnels.

35. The apparatus of claim 34 wherein said means for selecting further comprises:

means for determining an ingress tunnel ID for said tunneled session, said ingress tunnel ID uniquely identifying an ingress tunnel including said PPP session; and means for selecting one of said one or more available egress tunnels based on said ingress tunnel ID.

36. The apparatus of claim 34 wherein said means for selecting further comprises:

means for determining a subscriber domain for said tunneled session; and means for selecting one of said one or more available egress tunnels based on said subscriber domain.

37. The apparatus of claim 34 wherein said means for selecting further comprises:

means for examining Type of Service (ToS) bits associated with said PPP session; and means for selecting one of said one or more available egress tunnel based on said ToS bits.

38. The apparatus of claim 34 wherein said means for selecting further comprises:

means for examining a Virtual Path Identifier (VPI)/Virtual Channel Identifier (VCI) pair associated with said PPP session; and means for selecting one of said one or more available egress tunnel based on said VPI/VCI pair.

39. The apparatus of claim 34 wherein said means for selecting further comprises means for randomly selecting one of said one or more available egress tunnel connected to said remote domain.

40. The apparatus of claim 34 wherein said means for selecting further comprises:

means for determining available bandwidth for at least one egress tunnel to said remote domain; and means for selecting one of said one or more available egress tunnel to said remote domain having the most available bandwidth.

41. The apparatus of claim 34 wherein said means for selecting further comprises:

means for determining a time at which said PPP session is received; and means for selecting one of said one or more available egress tunnel based on said time.

42. The apparatus of claim 34 wherein said means for selecting further comprises:

means for determining a time at which said PPP session is received;

means for determining available bandwidth for at least one egress tunnel to said remote domain; and means for selecting one of said one or more available egress tunnel having the most available bandwidth at said time.

43. The apparatus of claim 34 wherein said means for selecting further comprises:

means for examining Type of Service (ToS) bits associated with said PPP session;

means for determining available bandwidth for at least one egress tunnel to said remote domain; and means for selecting one of said one or more available egress tunnel based on said ToS bits and said available bandwidth.

44. The apparatus of claim 34 wherein said means for selecting further comprises:

means for examining a Virtual Path Identifier (VPI)/Virtual Channel Identifier (VCI) pair associated with said PPP session;

means for determining a class of service based on said VPI/VCI pair;

means for determining available bandwidth for at least one egress tunnel to said remote domain; and means for selecting one of said one or more available egress tunnel based on said class of service and said available bandwidth.

45. The apparatus of claim 34 wherein said means for selecting further comprises means for selecting one of said one or more available egress tunnel to said remote domain having the smallest number of tunneled sessions such that tunneled sessions are distributed evenly among egress tunnels to said remote domain.

46. An apparatus for dynamic ingress to egress tunnel mapping on a communication network, the apparatus comprising:

a receiving interface to receive a tunneled communication from a subscriber using a first communication network, said first communication network connected to at least one communication network by at least one egress tunnel communicatively coupled to a remote domain;

an egress tunnel selection criteria determiner to determine egress tunnel selection criteria for said tunneled communication, said egress tunnel selection criteria indicating a basis for selecting one of said at least one egress tunnel, said egress tunnel selection criteria determiner adapted to determine said egress tunnel selection criteria based at least in part on a tunnel database comprising selection criteria for at least one egress tunnel connecting said first communication network to said at least one communication network;

an egress tunnel selector to select one of said at least one egress tunnel based on said egress tunnel selection criteria; and a session forwarder to forward said tunneled communication on the selected egress tunnel.

47. The apparatus of claim 46, further comprising a tunnel database initializer to initialize a tunnel database that includes tunnel selection criteria for said at least one egress tunnel connecting said first communication network to said at least one communication network.

48. The apparatus of claim 46 wherein said tunneled communication comprises a Point-to-Point Protocol (PPP) session.

49. The apparatus of claim 48 wherein said tunnels comprise L2TP tunnels.

50. The apparatus of claim 49 wherein said egress tunnel selector is further configured to select one of said one or more available egress tunnels based on an ingress tunnel ID.

51. The apparatus of claim 49 wherein said egress tunnel selector is further configured to select one of said one or more available egress tunnels based on a subscriber domain for said tunneled session.

52. The apparatus of claim 49 wherein said egress tunnel selector is further configured to select one of said one or more available egress tunnel based on ToS bits associated with said PPP session.

53. The apparatus of claim 49 wherein said egress tunnel selector is further configured to select one of said one or more available egress tunnel based on a Virtual Path Identifier (VPI)/Virtual Channel Identifier (VCI) pair associated with said PPP session.

54. The apparatus of claim 49 wherein said egress tunnel selector is further configured to randomly select one of said one or more available egress tunnel connected to said remote domain.

55. The apparatus of claim 49 wherein said egress tunnel selector is further configured to select one of said one or more available egress tunnel to said remote domain having the most available bandwidth.

56. The apparatus of claim 49 wherein said egress tunnel selector is further configured to select one of said one or more available egress tunnel based on a time at which said PPP session is received.

57. The apparatus of claim 49 wherein said egress tunnel selector is further configured to select one of said one or more available egress tunnel having the most available bandwidth at a time at which said PPP session is received.

58. The apparatus of claim 49 wherein said egress tunnel selector is further configured to select one of said one or more available egress tunnel based upon ToS bits associated with said PPP session and upon available bandwidth for at least one egress tunnel to said remote domain.

59. The apparatus of claim 49 wherein said egress tunnel selector is further configured to select one of said one or more available egress tunnel based on a Virtual Path Identifier (VPI)/Virtual Channel Identifier (VCI) pair and upon available bandwidth for at least one egress tunnel to said remote domain.

60. The apparatus of claim 49 wherein said egress tunnel selector is further configured to select one of said one or more available egress tunnel to said remote domain having the smallest number of tunneled sessions such that tunneled sessions are distributed evenly among egress tunnels to said remote domain.

61. The apparatus of claim 49, further comprising:
a monitor to periodically assess the loading of said apparatus; and
a notifier to indicate that ingress tunnels should be directed to a different apparatus when said loading exceeds a predetermined threshold.

62. A method for dynamic ingress to egress tunnel mapping on a communication network, the method comprising:
receiving a tunneled communication comprising a Point-to-Point Protocol (PPP) session from a subscriber using a first communication network, said first communication network connected to at least one communication network by at least one L2TP egress tunnel communicatively coupled to a remote domain;
determining egress tunnel selection criteria for said tunneled communication, said egress tunnel selection criteria indicating a basis for selecting one of said at least one L2TP egress tunnel;
selecting one of said at least one L2TP egress tunnel based on said egress tunnel selection criteria, said selecting further comprising:
examining Type of Service (ToS) bits associated with said PPP session;
determining available bandwidth for at least one L2TP egress tunnel to said remote domain; and
selecting one of said one or more available L2TP egress tunnel based on said ToS bits and said available bandwidth; and
forwarding said tunneled communication on the selected L2TP egress tunnel.

63. A method for dynamic ingress to egress tunnel mapping on a communication network, the method comprising:
receiving a tunneled communication comprising a Point-to-Point Protocol (PPP) session from a subscriber using a first communication network, said first communication network connected to at least one communication network by at least one L2TP egress tunnel communicatively coupled to a remote domain;
determining egress tunnel selection criteria for said tunneled communication, said egress tunnel selection criteria indicating a basis for selecting one of said at least one L2TP egress tunnel;
selecting one of said at least one L2TP egress tunnel based on said egress tunnel selection criteria, said selecting further comprising:
examining a Virtual Path Identifier (VPI)/Virtual Channel Identifier (VCI) pair associated with said PPP session;
determining a class of service based on said VPI/VCI pair;
determining available bandwidth for at least one egress tunnel to said remote domain; and
selecting one of said one or more available egress tunnel based on said class of service and said available bandwidth; and
forwarding said tunneled communication on the selected L2TP egress tunnel.

64. A method for dynamic ingress to egress tunnel mapping on a communication network, the method comprising:
receiving a tunneled communication comprising a Point-to-Point Protocol (PPP) session from a subscriber using a first communication network, said first communication network connected to at least one communication network by at least one L2TP egress tunnel communicatively coupled to a remote domain;
determining egress tunnel selection criteria for said tunneled communication, said egress tunnel selection criteria indicating a basis for selecting one of said at least one L2TP egress tunnel;
selecting one of said at least one L2TP egress tunnel based on said egress tunnel selection criteria, said selecting further comprising selecting one of said one or more available L2TP egress tunnel to said remote domain having the smallest number of tunneled sessions such that tunneled sessions are distributed evenly among egress tunnels to said remote domain; and forwarding said tunneled communication on the selected L2TP egress tunnel.

65. A program storage device readable by a machine, embodying a program of instructions executable by the machine to perform a method to dynamically map ingress to egress tunnels on a communication network, the method comprising:

receiving a tunneled communication comprising a Point-to-Point Protocol (PPP) session from a subscriber using a first communication network, said first communication network connected to at least one communication network by at least one L2TP egress tunnel communicatively coupled to a remote domain;

determining egress tunnel selection criteria for said tunneled communication, said egress tunnel selection criteria indicating a basis for selecting one of said at least one L2TP egress tunnel;

selecting one of said at least one L2TP egress tunnel based on said egress tunnel selection criteria, said selecting further comprising:
examining Type of Service (ToS) bits associated with said PPP session;
determining available bandwidth for at least one L2TP egress tunnel to said remote domain; and
selecting one of said one or more available L2TP egress tunnel based on said ToS bits and said available bandwidth; and forwarding said tunneled communication on the selected L2TP egress tunnel.

66. A program storage device readable by a machine, embodying a program of instructions executable by the machine to perform a method to dynamically map ingress to egress tunnels on a communication network, the method comprising:

receiving a tunneled communication comprising a Point-to-Point Protocol (PPP) session from a subscriber using a first communication network, said first communication network connected to at least one communication network by at least one L2TP egress tunnel communicatively coupled to a remote domain;

determining egress tunnel selection criteria for said tunneled communication, said egress tunnel selection criteria indicating a basis for selecting one of said at least one L2TP egress tunnel;

selecting one of said at least one L2TP egress tunnel based on said egress tunnel selection criteria, said selecting further comprising:
examining a Virtual Path Identifier (VPI)/Virtual Channel Identifier (VCI) pair associated with said PPP session;
determining a class of service based on said VPI/VCI pair;
determining available bandwidth for at least one egress tunnel to said remote domain; and
selecting one of said one or more available egress tunnel based on said class of service and said available bandwidth; and forwarding said tunneled communication on the selected L2TP egress tunnel.

67. A program storage device readable by a machine, embodying a program of instructions executable by the machine to perform a method to dynamically map ingress to egress tunnels on a communication network, the method comprising:

receiving a tunneled communication comprising a Point-to-Point Protocol (PPP) session from a subscriber using a first communication network, said first communication network connected to at least one communication network by at least one L2TP egress tunnel communicatively coupled to a remote domain;

determining egress tunnel selection criteria for said tunneled communication, said egress tunnel selection criteria indicating a basis for selecting one of said at least one L2TP egress tunnel;

selecting one of said at least one L2TP egress tunnel based on said egress tunnel selection criteria, said selecting further comprising selecting one of said one or more available L2TP egress tunnel to said remote domain having the smallest number of tunneled sessions such that tunneled sessions are distributed evenly among egress tunnels to said remote domain; and forwarding said tunneled communication on the selected L2TP egress tunnel.

68. An apparatus for dynamic ingress to egress tunnel mapping on a communication network, the apparatus comprising:

means for receiving a tunneled communication comprising a Point-to-Point Protocol (PPP) session from a subscriber using a first communication network, said first communication network connected to at least one communication network by at least one L2TP egress tunnel communicatively coupled to a remote domain;

means for determining egress tunnel selection criteria for said tunneled communication, said egress tunnel selection criteria indicating a basis for selecting one of said at least one L2TP egress tunnel;

means for selecting one of said at least one L2TP egress tunnel based on said egress tunnel selection criteria, said means for selecting further comprising:
means for examining Type of Service (ToS) bits associated with said PPP session;
means for determining available bandwidth for at least one L2TP egress tunnel to said remote domain; and
means for selecting one of said one or more available L2TP egress tunnel based on said ToS bits and said available bandwidth; and means for forwarding said tunneled communication on the selected L2TP egress tunnel.

69. An apparatus for dynamic ingress to egress tunnel mapping on a communication network, the apparatus comprising:

means for receiving a tunneled communication comprising a Point-to-Point Protocol (PPP) session from a subscriber using a first communication network, said first communication network connected to at least one communication network by at least one L2TP egress tunnel communicatively coupled to a remote domain;

means for determining egress tunnel selection criteria for said tunneled communication, said egress tunnel selection criteria indicating a basis for selecting one of said at least one L2TP egress tunnel;

means for selecting one of said at least one L2TP egress tunnel based on said egress tunnel selection criteria, said means for selecting further comprising:
means for examining a Virtual Path Identifier (VPI)/Virtual Channel Identifier (VCI) pair associated with said PPP session;
means for determining a class of service based on said VPI/VCI pair;
means for determining available bandwidth for at least one egress tunnel to said remote domain; and means for selecting one of said one or more available egress tunnel based on said class of service and said available bandwidth; and means for forwarding said tunneled communication on the selected L2TP egress tunnel.

70. An apparatus for dynamic ingress to egress tunnel mapping on a communication network, the apparatus comprising:
- means for receiving a tunneled communication comprising a Point-to-Point Protocol (PPP) session from a subscriber using a first communication network, said first communication network connected to at least one communication network by at least one L2TP egress tunnel communicatively coupled to a remote domain;
- means for determining egress tunnel selection criteria for said tunneled communication, said egress tunnel selection criteria indicating a basis for selecting one of said at least one L2TP egress tunnel;
- means for selecting one of said at least one L2TP egress tunnel based on said egress tunnel selection criteria, said selecting further comprising selecting one of said one or more available L2TP egress tunnel to said remote domain having the smallest number of tunneled sessions such that tunneled sessions are distributed evenly among egress tunnels to said remote domain; and
- means for forwarding said tunneled communication on the selected L2TP egress tunnel.

71. An apparatus for dynamic ingress to egress tunnel mapping on a communication network, the apparatus comprising:
- a receiving interface to receive a tunneled communication comprising a Point-to-Point Protocol (PPP) session from a subscriber using a first communication network, said first communication network connected to at least one communication network by at least one L2TP egress tunnel communicatively coupled to a remote domain;
- an egress tunnel selection criteria determiner to determine egress tunnel selection criteria for said tunneled communication, said egress tunnel selection criteria indicating a basis for selecting one of said at least one L2TP egress tunnel;
- an egress tunnel selector to select one of said at least one L2TP egress tunnel based on said egress tunnel selection criteria, said egress tunnel selector further configured to select one of said one or more available L2TP egress tunnel based upon ToS bits associated with said PPP session and upon available bandwidth for at least one L2TP egress tunnel to said remote domain; and
- a session forwarder to forward said tunneled communication on the selected L2TP egress tunnel.

72. An apparatus for dynamic ingress to egress tunnel mapping on a communication network, the apparatus comprising:
- a receiving interface to receive a tunneled communication comprising a Point-to-Point Protocol (PPP) session from a subscriber using a first communication network, said first communication network connected to at least one communication network by at least one L2TP egress tunnel communicatively coupled to a remote domain;
- an egress tunnel selection criteria determiner to determine egress tunnel selection criteria for said tunneled communication, said egress tunnel selection criteria indicating a basis for selecting one of said at least one L2TP egress tunnel;
- an egress tunnel selector to select one of said at least one L2TP egress tunnel based on said egress tunnel selection criteria, said egress tunnel selector further configured to select one of said one or more available L2TP egress tunnel based on a Virtual Path Identifier (VPI)/Virtual Channel Identifier (VCI) pair and upon the available bandwidth for at least one L2TP egress tunnel to said remote domain; and
- a session forwarder to forward said tunneled communication on the selected L2TP egress tunnel.

73. An apparatus for dynamic ingress to egress tunnel mapping on a communication network, the apparatus comprising:
- a receiving interface to receive a tunneled communication comprising a Point-to-Point Protocol (PPP) session from a subscriber using a first communication network, said first communication network connected to at least one communication network by at least one L2TP egress tunnel communicatively coupled to a remote domain;
- an egress tunnel selection criteria determiner to determine egress tunnel selection criteria for said tunneled communication, said egress tunnel selection criteria indicating a basis for selecting one of said at least one L2TP egress tunnel;
- an egress tunnel selector to select one of said at least one L2TP egress tunnel based on said egress tunnel selection criteria, said egress tunnel selector further configured to select one of said one or more available L2TP egress tunnel to said remote domain having the smallest number of tunneled sessions such that tunneled sessions are distributed evenly among L2TP egress tunnels to said remote domain; and
- a session forwarder to forward said tunneled communication on the selected L2TP egress tunnel.

* * * * *